United States Patent
Baur et al.

(10) Patent No.: US 10,985,446 B1
(45) Date of Patent: Apr. 20, 2021

(54) PHYSICALLY RECONFIGURABLE STRUCTURALLY EMBEDDED VASCULAR ANTENNA AND METHOD OF MAKING

(71) Applicant: Government of the United States, as represented by the Secretary of the Air Force, Wright-Patterson AFB, OH (US)

(72) Inventors: Jeffery W Baur, Liberty Township, OH (US); Gregory H Huff, College Station, TX (US); Darren J Hartl, College Station, TX (US); Geoffrey J Frank, Dayton, OH (US); Hong Pan, Norman, OK (US); Robyn L Bradford, Bellbrook, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 293 days.

(21) Appl. No.: 15/922,097

(22) Filed: Mar. 15, 2018

Related U.S. Application Data

(60) Provisional application No. 62/472,631, filed on Mar. 17, 2017, provisional application No. 62/472,626, filed on Mar. 17, 2017.

(51) Int. Cl.
*H01Q 1/24* (2006.01)
*H01Q 9/28* (2006.01)

(52) U.S. Cl.
CPC .............. *H01Q 1/245* (2013.01); *H01Q 9/28* (2013.01)

(58) Field of Classification Search
CPC .. H01Q 9/16; H01Q 3/20; H01Q 5/15; H01Q 5/30; H01Q 15/002; H01Q 15/0026; H01Q 1/364
See application file for complete search history.

(56) References Cited

U.S. PATENT DOCUMENTS

| | | | | |
|---|---|---|---|---|
| 6,967,628 | B2 * | 11/2005 | Rawnick | H01Q 1/364 343/789 |
| 8,587,493 | B2 * | 11/2013 | Dickey | G01L 1/205 343/789 |
| 9,804,607 | B1 * | 10/2017 | Coleman | B23P 11/00 |
| 10,249,947 | B1 * | 4/2019 | Chun | H01Q 9/30 |
| 2010/0095762 | A1 * | 4/2010 | Despesse | H01Q 1/243 73/290 V |

(Continued)

*Primary Examiner* — Dameon E Levi
*Assistant Examiner* — Jennifer F Hu
(74) *Attorney, Agent, or Firm* — AFMCLO/JAZ; Timothy Barlow

(57) ABSTRACT

A method of making a reconfigurable antenna comprises the steps of applying one or more first layers of a prepreg laminate fabric to a form having a desired contour; applying a pattern corresponding to an antenna shape to the first layers of prepreg fabric; applying one or more second layers of the prepreg laminate fabric atop the pattern to form a laminate stack; curing the laminate stack; and removing the pattern to form channels in the antenna shape. The desired contour may be an aircraft skin panel or an airfoil panel. The pattern may be a polymer sheet with an applied cPLA antenna design. The curing step may be performed in a vacuum bag under the application of vacuum and heat. The removing step may be performed by heating the cured laminate stack to remove the pattern.

10 Claims, 32 Drawing Sheets

(56) References Cited

U.S. PATENT DOCUMENTS

2010/0319572 A1* 12/2010 Abys ................. C23F 11/10
106/14.42
2017/0325359 A1* 11/2017 Lazarus ............... H05K 1/0272

* cited by examiner

Schematic description of the novel combination RF/LM metal feed structure

PHYSICALLY RECONFIGURABLE STRUCTURALLY EMBEDDED VASCULAR ANTENNA AND METHOD OF MAKING

Pursuant to 37 C.F.R. § 1.78(a)(4), this application claims the benefit of and priority to prior filed Provisional Application Ser. No. 62/472,631, filed 17 Mar. 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to antennas embedded into structural components and, more particularly, to a physically reconfigurable structurally embedded vascular antenna and methods of making them.

BACKGROUND OF THE INVENTION

Broadband antennas are highly advantageous in the field of telecommunications, and some of the most common broadband radiators are spiral, bow-tie, and log periodic antennae. This class of antenna has many geometric variations but it is generally designed so as to maintain radiation characteristics and impedance behavior over large bandwidths. The log periodic antenna is based on the logarithmic growth of repeating unit cells. The bow-tie is based on increasing triangular unit cell connected to two central electromagnetic leads. Overlapping frequency bands coalesce to provide broadband behavior, and these frequencies are determined by the size, growth rate, and aperture angle of the repeating cells.

In addition, structurally-embedded antennas have been studied. Conformal load-bearing antenna structure (CLAS) forms studied to date have included "smart-skin" antennas based on honeycomb sandwiching, pixelated arrays of microstrip patch antennas, Yagi-Uda arrays fabricated via direct write, high-gain log-periodic dipoles and slotted spiral antennas.

The most studied CLAS concept is the slotted waveguide antenna stiffened structure (SWASS), which has been experimentally demonstrated to be one of the most effective designs in terms of its structural and RF performance. However, such an arrangement is demanding from a manufacturing perspective because it requires high tolerance features for the slots and the structural waveguide.

A reconfigurable liquid metal antenna array within an aerospace-grade fiber-reinforced composite is unknown, particularly with the ability to controllably vary the resonant frequency of the antenna over a large frequency range and mode shape. Accordingly, what is desired is a radio frequency (RF) antenna that minimizes installation area and/or weight by both being directly embedded into the surrounding load-bearing structure and is reconfigurable, i.e., a structurally embedded vascular antenna (SEVA), such that a single fed antenna can meet numerous RF mission objectives.

SUMMARY OF THE INVENTION

The present invention overcomes the foregoing problems and other shortcomings, drawbacks, and challenges of antenna structures. While the invention will be described in connection with certain embodiments, it will be understood that the invention is not limited to these embodiments. To the contrary, this invention includes all alternatives, modifications, and equivalents as may be included within the spirit and scope of the present invention.

Currently, most antennas have separate electronics components and structural elements which protect the electronics but allow the electromagnetic energy to pass through. Many examples of structurally integrated antenna exist, including conformally printed elements, structurally embedded solid metals, and structural slot waveguides. Rather than structurally embedded fixed elements, what is desirable is a structural antenna assembly having active radiating elements that are made reconfigurable by the transport of non-toxic liquid metal which is transported within internal passages of the structural antenna to create a number of different configurations of the active radiating elements within a structural composite. The resonance frequency of each element is changed according to the configuration assumed by the liquid metal. Thus, multiple distinct antennas having distinct operating characteristics may be achieved with the same liquid metal within a structural element by transporting the liquid metal into different internal passages.

A goal of the present invention is to provide a continuously tunable broadband performance antenna having a large frequency range with stable radiation behavior. A further goal is to provide steering via pattern diversity and/or reconfiguration. The antenna topology chosen to enable both behaviors derives from a length-tunable dipole antenna meandered sinusoidally and antipodally in the lateral (resonant) direction and expanded transversely in a power-series growth envelope. The resulting structure is confined to a geometric region in plane resembling that of a bowtie antenna, but also benefits from the fundamental behavior of a dipole that is controllable using the flow of liquid metal (LM) in the microvascular channel. The meandering is derived from the zig-zag style of wire log periodic antenna; these antennas can provide stable radiation and impedance characteristics across one or more large bandwidths. The characteristic frequency bands are associated with the aperture angle, size, and rate of growth of the repeating cells. The meandering leads to a number of resonance modes and creates a wider tuning range when compared to a simple linear dipole. It also provides a convenient platform for studying non-trivial planar configurations of LM-filled channels.

The present invention leverages several technologies to engineer a physically reconfigurable structurally embedded vascular antenna (SEVA). The SEVA merges fused deposition modeling (FDM) additive manufacturing and multilayer composite processing methods. The vascular network which forms the antenna may be a thin-wire meandering dipole that is tuned electromagnetically using a controlled flow (e.g. pressure-driven or magnetohydrodynamic) of a liquid metal alloy, e.g. eutectic gallium-indium alloy (EGaIn). In addition, embodiments presented herein provide more "electromagnetically quiet" options for reconfiguring radiating RF circuits that are structurally embedded, such as through the use of pneumatics, peristaltic, and/or magnetohydrodynamics to move the liquid metal (LM). Other approaches which uses switches between RF elements cause an induction spike when connecting or disconnecting the circuit which makes them "noisy".

A particular geometry presented herein is the zig-zag wire log periodic dipole antenna, which may not have the instantaneous broadband behavior that is characteristic of the log periodic antenna. Rather, it includes liquid metal in a reconfigurable dipole configuration that is derived from the family of log periodic structures. Liquid metals are important for the disclosed embodiments due to their low- or non-toxic properties, relatively low viscosity, and high electrical conductivity compared to other fluids, though they present some challenges in terms of oxide formation. In one embodiment of the invention, a eutectic gallium-indium alloy (EGaIn) may be used as the liquid metal. EGaIn is non-toxic and remains liquid to −20° C., but EGaIn may be costly and may corrode other metals with which it comes in contact.

Creating networks of micro-channels in structural composites to create multifunctional structures has been studied for some time, but the consideration of liquid metal circuits embedded in structural materials, e.g. composites, provides greater challenges.

This is the first fabrication and demonstration of an array of active antenna elements which may be individually configured and networked to create a phase array with unprecedented range in frequency and steering within a structural composite and for a modest increase in size, weight, and power. The structural antennas disclosed herein would replace the typically expensive single-use electronic modules which are not integrated into the structure, are capable of operation in a narrow range based on a fixed antenna geometry, and which increase the size and weight of the combined systems. There may be advantages in servicing such structurally decoupled phase arrays, but for applications such as low-cost aircraft having a limited life, this is less of an issue. There is an additional advantage to the use of liquid metals in antenna systems, including to cool the electromagnetic components or the structure to achieve either greater antenna power, to maintain the temperature of the electromagnetic element, or cool/heat the structure. Complete withdrawal of the liquid metal from the electromagnetic (EM) active region of the structure may serve to remove the EM active element, or serve as a variable shutter. This feature may be quite useful for agile aircraft communication and navigation, for the protection of internal components against high energy wavelengths, and for the thermal management of embedded electrical components or structures.

According to one embodiment of the present invention a reconfigurable antenna comprises a panel having a liquid metal pump coupled to a power supply; a liquid metal reservoir in fluid communication with the pump; one or more channels for transporting the liquid metal, each of the one or more channels having a proximal end in fluid connection with the pump, each of the one or more channels having a vent at a distal end, wherein application of power to the pump moves the liquid metal into or out of the channels thereby reconfiguring the antenna.

This arrangement provides the advantages of an antenna that is reconfigurable for use in several roles and in distinct wavelengths/frequencies.

According to another embodiment of the invention, the pump may be a pneumatic pump, peristaltic pump or a magnetohydrodynamic pump.

These pumps provide the advantages of a quietly reconfigurable antenna.

According to a further embodiment of the invention, the reconfigurable antenna further comprises a layer of a phosphonic acid on the liquid metal-bearing channel surfaces, and the phosphonic acid is selected from the group consisting of decylphosphonic acid (DPA), fluorobenzylphosphonic acid (FPA), and difluorobenzylphosphonic acid (DFPA).

The phosphonic acids provide the advantages of reduced or eliminated handling problems with liquid metals, e.g. EGaIn, in channels having small dimensions.

According to another embodiment of the invention, the reconfigurable antenna further comprises one or more sensors for determining the position of the liquid metal in the channels, and the one or more sensors may include one or more flow meters and optical sensors.

These sensors provide the advantages of positive determination of the exact placement of the liquid metal in the channels, corresponding to a particular frequency/wavelength.

According to a further embodiment of the invention, the pump is reversible to control the direction of the flow of the liquid metal and a dielectric fluid, e.g. fluorinert.

This arrangement provides the advantage of the ability to quietly inject and withdraw liquid metal into the channels to controllably alter the operating characteristics of the reconfigurable antenna.

According to another embodiment of the invention, the panel comprises one of a structural panel, a conformal load-bearing panel, and an aircraft skin panel.

The panels provide the advantage of an antenna that is fully incorporated into its supporting structure, without protrusions or aerodynamic comprises.

According to a further embodiment of the invention, the channels have internal dimensions ranging between 200-700 µm in height and 200-700 µm in width.

The channel dimensions provide the advantage of effective RF performance without comprising the strength and toughness of the panel.

According to another embodiment of the invention, the liquid metal reservoir further comprises a heat exchanger.

The heat exchanger provides the advantage of the release of excess heat which may be generated by the reconfigurable antenna in use.

According to a further embodiment of the invention, the channels have a sectional shape corresponding approximately to a circle and an ellipse.

The shape of the channels provides the advantage of minimal or no impact of the strength and toughness of the finished panel.

According to another embodiment of the invention, each channel is formed in one or more layers of a panel.

This arrangement provides the advantage of a panel that is easy to manufacture, according to known composite-manufacturing techniques, and which provides sufficient strength for the panel's role as a structural element.

According to a further embodiment of the invention, the reconfigurable antenna may further comprise a stacked antenna made from two or more different micro-channels patterns, each in a different plane within the thickness of the structural composite.

This stacked arrangement may provide the advantage of a single antenna with a combined antenna response. The progression of the liquid metal within each of the channels may be independently varied to produce a combined antenna response. For planar elements, six sinusoidal elements may be created within a complex curved composite structure using fused deposition printing of sacrificial catalyzed poly (lactic acid) (cPLA) followed by transfer to a complex-shaped female tool/form, composite lamination, composite cure, and thermal removal of the sacrificial cPLA during post-cure. Each sinusoidal element may correspond to the direction of the layers of a composite material comprising the structural antenna.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 16-16C depict the removal of cPLA at 190° C. oven set temp. (FIG. 16), along with a time sequential progression of cPLA evacuation; FIG. 16A depicts the initial weeping of material around the drilled holes after approximately 1.2 hours in the oven at 190° C., circles indicate drilled hole locations; FIG. 16B depicts a reverse contrast image after 3.8 hours, the zoomed image shows material building up at circled location XI due to the inclined slope; FIG. 16C depicts the panel after 18 hours at 190° C. under dynamic vacuum conditions, where residual material remains in the channels after removal from the oven, according to an embodiment of the invention;

FIGS. 18A-18C depict a comparison of the retained printed pattern after processing at 190° and 200° C., according to an embodiment of the invention;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

This invention presents the design, fabrication, and analysis of a "bowtie"-type broadband antenna embedded in a square structural composite panel approximately 6 inches (≈150 mm) in length/width and having radiating elements comprised of liquid metal (LM), these being energized by a custom feed that satisfies both fluid mass and electromagnetic energy transfer goals. EGaIn liquid metal is employed as the reconfigurable electromagnetic fluid. One of the primary advantages of the SEVA concept is the ability to alter antenna transmission or receiving qualities in situ by changing the location or distribution of LM infill into the microvascular network. This permits tuning of resonant frequency and gross adaptation of directivity and gain associated with discrete resonant mode changes as well.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1A:
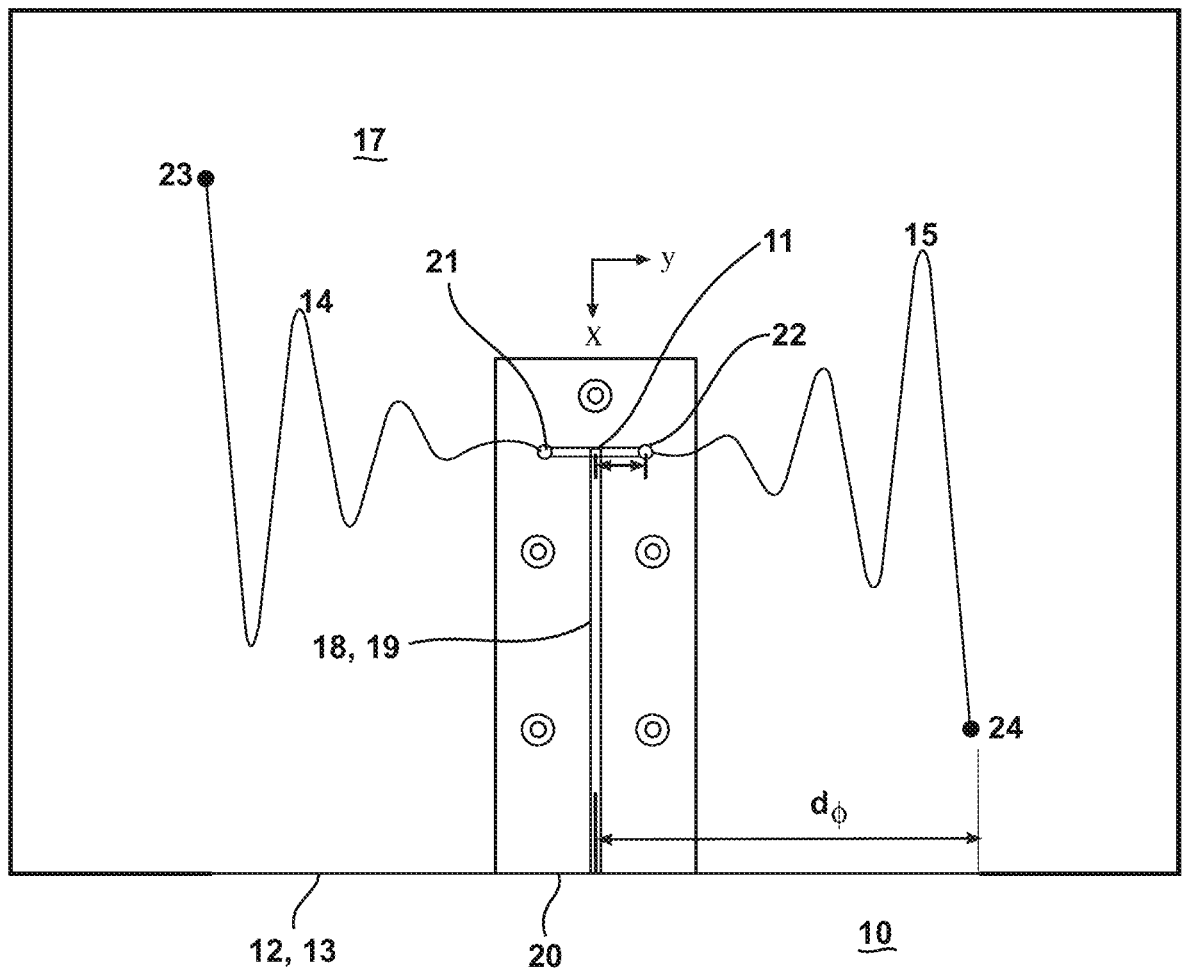
FIGS. 1A-1B illustrate plan and profile views of a SEVA-RL reconfigurable antenna with a parallel-strip feed network, according to an embodiment of the invention.
Figure 1B:
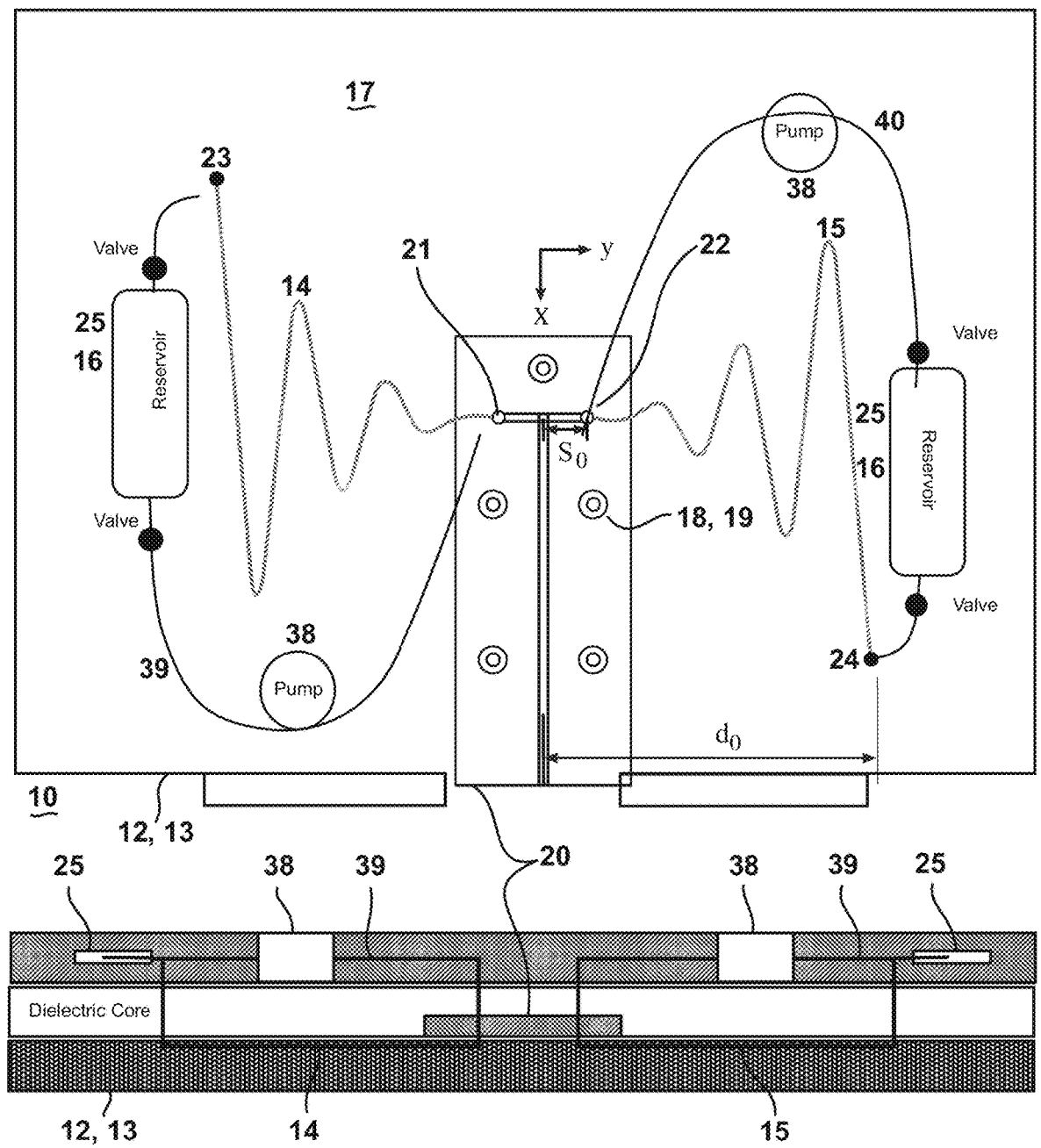

FIGS. 1A-1B illustrate a CAD model of the SEVA-RL (Structurally Embedded Vascular Antenna-Relaxed Logarithmic) 10 with its parallel-strip feed network 11. The feed network 11 was designed in concert with the SEVA 10 to provide a balun-like transition in the form of an antipodal dipole and to create physical spacing between the insertion points for liquid metal 16, as explained below. These two substrates 12, 13 (the laminate composite 21, 22 with the LM channels 14, 15, and the PCB/FR4 20 with the copper traces 18, 19 for injecting RF energy) may be aligned and fastened mechanically by drilling both substrates and tapping to match the threading of screws, e.g., nylon screws.

The two channels 14, 15 for transporting a liquid metal 16 may have a generally elliptical or circular cross-section may be embedded between the middle two plies of a woven quartz fiber-based electromagnetically compatible composite laminate 17. In the exemplary embodiment presented in FIG. 1A, the planform size of the composite panel 17 containing the LM channels 14, 15 is 152 mm×152 mm while its thickness is about 2.25 mm. The size is not critical at all; the antennas may be made any size desired. The two channels 14, 15 emanate from two closely located points corresponding to copper vias 26, 27 and, in the plane of the panel 17, follow sinusoidal paths with increasing amplitudes, as depicted in FIG. 1A. Electromagnetically, this corresponds to a sinusoidal zig-zag wire log periodic dipole antenna with a balanced copper feed located at the center. A small piece of FR4 material 20 may be used to create the balanced feed is about 0.813 mm while the copper traces 18, 19 that comprise the microstrip feeds (of parallel strip feed network 11) may be about 0.10 mm in thickness. These dimensions are provided as an example for an embodiment, but should not be understood to be deterministic. The amount of LM 16 from the LM reservoirs 25 driven (via pump 38) into the channels 14, 15 (i.e., the length of the antenna traces) through inlet ports 21, 22 may be independently altered and/or the antenna resonance re-tuned or its directivity steered using a number of switched fluid exit ports 23, 24. Upon reaching the exit ports 23, 24, respective return circuits 39, 40 and pumps 38 may be used to return the LM 16 to the reservoirs 25 and the respective inlet ports 21, 22.

Figure 2:
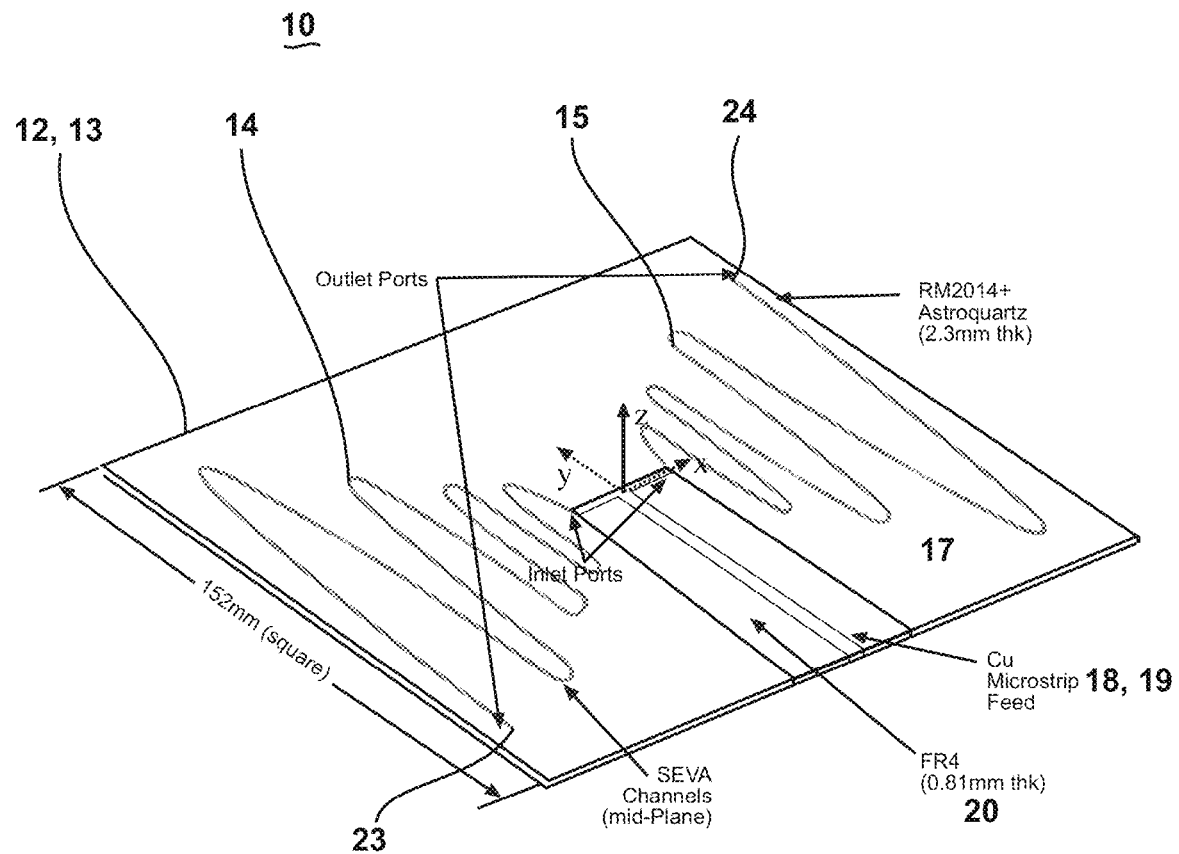
FIG. 2 illustrates a perspective view of a reconfigurable liquid metal antenna, according to an embodiment of the invention.

FIG. 2 illustrates a perspective view of a reconfigurable liquid metal antenna 10, according to an embodiment of the invention. The main body (the antenna panel) 17 of the device 10 may be a structural composite laminate comprised of multiple plies (see FIG. 6) of woven quartz fiber in a low dielectric loss epoxy (e.g., Renegade RM2014). At the mid-plane (e.g., between plies 4 and 5), two independent planar channels 14, 15 which may have a complex sinusoid-based form (or other desired configuration) provide a path for the flow of liquid metal 16 from an inlet port 21, 22 toward a respective outlet port 23, 24; these channels 14, 15 represent the two arms of a dipole antenna. A novel custom antenna feed structure 11 (the feed panel) may be fabricated primarily from copper-clad FR4 and may be used to provide electromagnetic energy to the two radiating antenna arms 14, 15. The principle of operation relies on the ability of the embedded channels 14, 15 to be filled to different lengths with liquid metal 16, completely changing the geometric configuration of the radiating antenna structure 10. The same principle may be used to reconfigure a wide range of antenna types. Additionally, the antenna panel itself may be fully structural and capable of taking significant aerodynamic and in-plane loads.

The Bowtie Antenna—The zig-zag wire log antenna (see FIGS. 1A-2) is simple to design and has a similar performance to other periodic antennas. This design may be operated at several frequencies; it can be easily reconfigured by altering the length of the dipole via insertion or extraction of liquid metal 16. Typically, the zig-zag antenna may have a triangular or trapezoidal tooth design; however, a sinusoidal tooth is presented herein. The smooth curves of channels 14, 15 aid in the retention of the structural integrity of the panel 10 and may also be advantageous for the flow of the liquid metal 16 in the channels 14, 15 with reduced resistance. In addition, this design, unlike some other log-periodic antennas, may be entirely contained within a single dimensional plane (see FIG. 4B), and multiple radiating segments are not required, making it ideal for embedding in a structural composite 17, as depicted in FIG. 2.

The topology considered in this work has been modified so as to be inscribed with that of a bowtie antenna. The primary motivation for this, from an electromagnetic standpoint, is a meandering dipole configuration that has space-filling geometric characteristics of both a log periodic and bowtie topologies, and to assess the impact of embedding, e.g., an antenna within a structural composite.

Given the exponential growth of the sinusoidal form, the particular antenna arrangement depicted in FIG. 1A may be referred to as the SEVA-RL (Relaxed Logarithmic), and FIG. 2 may be referred to as the SEVA-ES (Exponential Sinusoid) based on the respective channels arrangements. These two arrangements are mathematically distinct. In the SEVA-RL embodiment the sinusoidal is moved a little further out from the central feed structure (a longer initial straight channel), which provides for cleaner RF.

The specific planar configuration of a given pole in the SEVA-ES dipole/bowtie antenna is given by the following two relations in x-y space (see FIG. 2) in terms of the parameters:

$$x = (0.8^s)\hat{L}$$
$$y = \tan(\theta/2)|\cos(\pi s)|^{1.2-s}\text{sgn}(\cos(\pi s))(0.8^s)\hat{L}$$
$$; 3.25 \le s \le 11.5$$

where θ is the bowtie angle and $\hat{L}$ is a length parameter. In one embodiment of the invention, θ=π/2 and $\hat{L}$=150 mm. Note that one pole is rotated by π rad about the z-axis relative to the other.

Liquid Metal/RF Feed Network Design

To feed the antenna design, a balanced-to-unbalanced transition (or balun) may be used. In the depicted arrangement, a parallel strip (e.g., a microstrip) line 11 acts as a balun to transmit the excitation from a coaxial cable (50 Ω feed) to the center of the antenna (vias 26, 27). The feed network 11 resides in the plane of the composite panel 17 and thus minimizes unwanted interference, coupling, and blockage.

Figure 3:
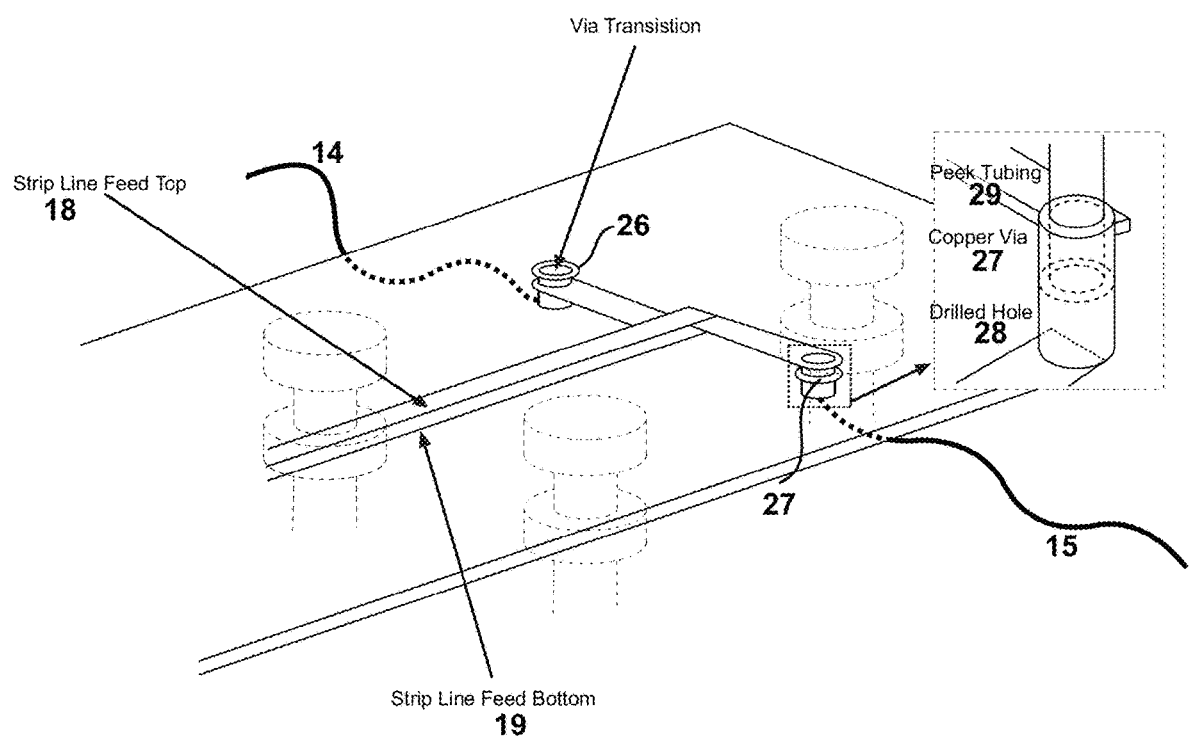
FIG. 3 illustrates a perspective view of an antipodal dipole and vertical feed structure for insertion of liquid metal alloys into a SEVA-RL, according to an embodiment of the invention.

The unique challenges involved in mating the feed panel 11 to the liquid metal antenna domain were met using special vias 26, 27 formed from copper tubing, as schematically illustrated in FIG. 3. The use of copper tubing as vias allows for fluid flow of EGaIn and also for a continuous electrical path from the copper microstrip lines 18, 19 to the EGaIn filling the micro-channels 14, 15 at the mid-plane of the antenna panel 17. The 50 Ω parallel-strip feed lines of width $w_f$=2.7 mm may be fabricated on an FR4 substrate ($ε_r$=4.4, Tan δ=0.02) of height $h_f$=31 mil (0.7874 mm). The traces may extend about 1 cm beyond the edge of the composite in the x-direction where they are terminated in a printed circuit board (PCB) end-launch SMA (sub-miniature version A, a common RF connector) connector (including vias for connecting the ground pins and pads); this is for connection to measurement cables. This transition may be used in place of a (tapered, etc.) microstrip-to-parallel strip transition.

FIG. 3 provides a detailed view of the feed network 11 where it terminates in an antipodal dipole with arm lengths $s_0$=10.0 mm and widths $w_d$=$W_f$. The purpose of this antipodal dipole is to act as a balun-like transition from the coplanar strips to a dipole antenna topology. It also provides physical separation between the two hollow metallic vias 26, 27 (inset shown in FIG. 3) that serve as vertical interconnects between the antipodal dipole and the SEVA-RL. These vias 26, 27 are also used to insert liquid metal 16 into the SEVA-RL 10 and thus to physically reconfigure the antenna.

Antenna Design

The SEVA-RL is designed to operate as a thin-wire dipole with rotationally symmetric arms that meander outward from the antipodal dipole. The SEVA-RL arms (channels 14, 15) meander according to the parametric equations (see equation below) for a sinusoidal oscillation with a power-series envelope according to the channel filling parameter t, $s_0$, and maximum physical length $2d_0$=6 in. (152.4 mm) such that the antenna meanders in the lateral (x) direction. The "±" provides rotational symmetry of the dipole arms, the envelope parameter α=20 controls growth of the oscillatory behavior, the parameter $s_0$=0.39 inch (10 mm) is an initial offset, and the parameter $p_0$=2 controls the periodicity of the oscillation.

$$x(t) = \pm \frac{t^\alpha}{d_0^{\alpha-1}} \sin[p_0 \pi t]$$

$$y(t) = t + s_0$$

The parameterization in the equation above was chosen specifically because it provides a linearized outward transition from the antipodal dipole and the ability to control the degree of complexity introduced from meandering. This was found to be important in preliminary experimental studies leading up to this work. As a demonstration vehicle for a new antenna fabrication technique, this also represents a compromise in terms of the complexity and dimension that are possible to ensure multi-physics analysis tools capture key properties.

Reconfiguration

A driven flow of LM 16 into the channels 14, 15 allows radiating and parasitic antenna elements to be controllably created, lengthened, or shortened. For example, full evacuation of the channels 14, 15 completely removes these conductive regions from the electromagnetic domain. Physical reconfiguration of the SEVA-RL is achieved through the channel filling parameter t. Increasing t corresponds to the insertion of additional EGaIn into the channels 14, 15. This parameter extends from t=0 (the edge of the antipodal dipole) to the perimeter of the substrate at t=2.675 in simulation and to fluid extraction vias located at t=2.6 in experiment. To first order, the physical reconfiguration of the antenna from the insertion of EGaIn in the channel facilitates an increase in the electrical length of the dipole. This arrangement enables a downward shift in the 2:1 VSWR impedance bandwidth of the first radiating dipole mode. The behavior of higher order modes is not considered a priori, but it is also expected that these will be impacted by meandering.

Figure 30:
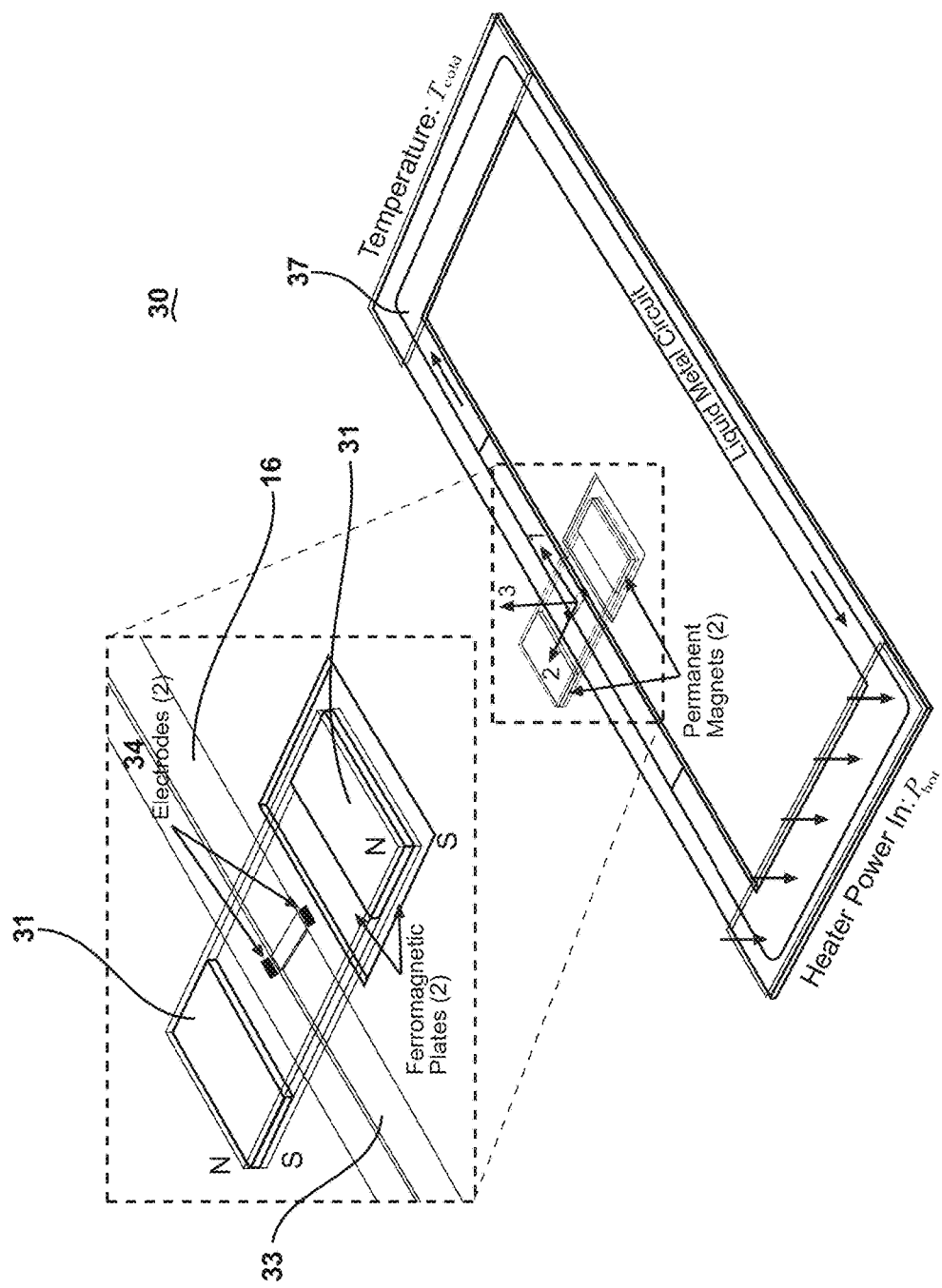
FIG. 30 illustrates details of a DC magnetohydrodynamic (MHD) pump, according to an embodiment of the invention.
Figure 31:
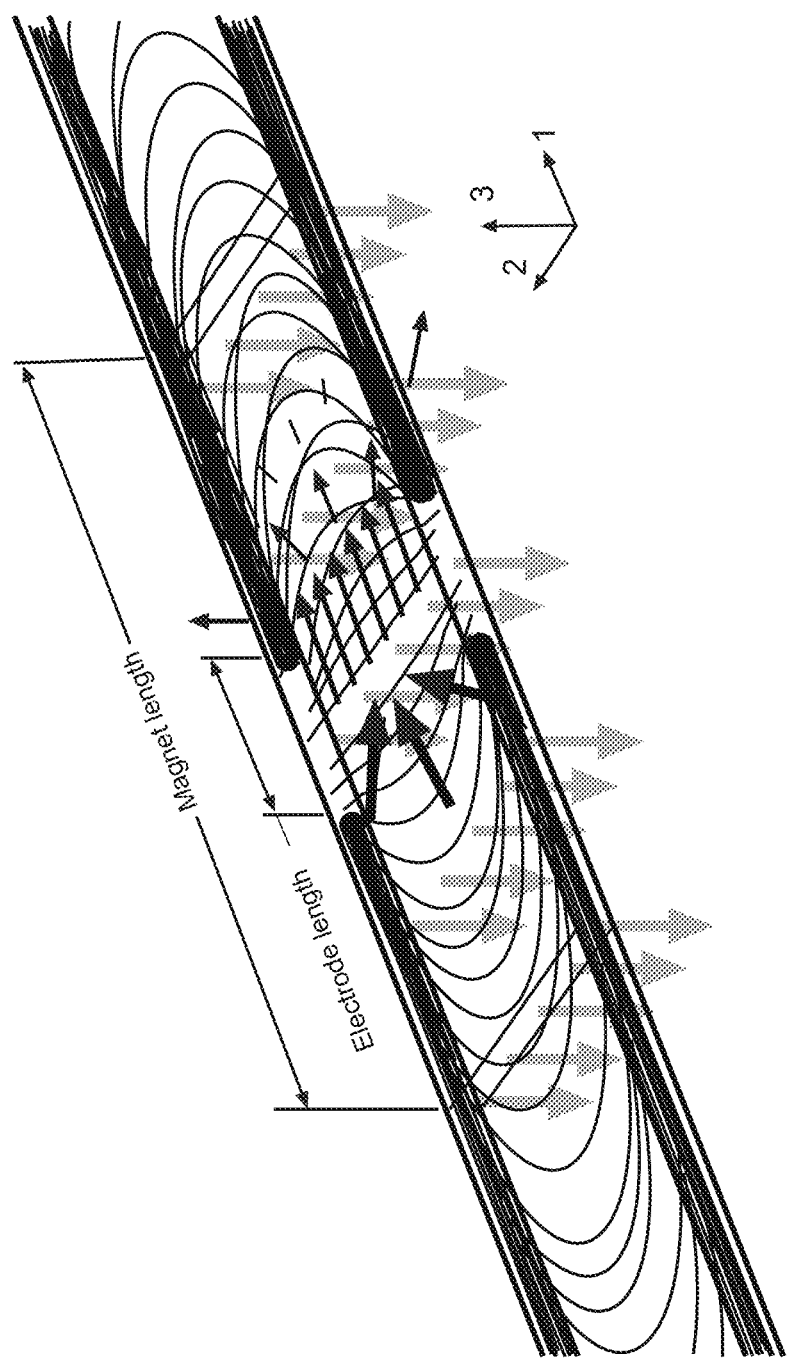
FIG. 31 illustrates a generalized DC MHD pumping effect, according to an embodiment of the invention.

EGaIn (liquid metal 16) may be moved into and out of the channels 14, 15 by several acceptable means, including one or more pneumatic pumps, peristaltic pumps, and/or magnetohydrodynamic (MHD) pumps 30 (see FIGS. 30-31 for MHD pump details). These approaches provide for quietly reconfiguring the antenna through rapid movement of the liquid metal 16, e.g. EGaIn, into and out of the channels 14, 15 to achieve the desired performance characteristics of the antenna 10. A fluid circuit includes the channels 14, 15 and a reservoir 25 having a supply of a liquid metal 16. In one embodiment, a pneumatic pump 38 may be coupled with the LM reservoir 25 in order to displace LM 16 into the channels 14, 15. The liquid pumping may be suspended when the appropriate amount of LM 16 is in the channels 14, 15. The appropriate amount of LM 16 in the channels 14, 15 may be determined by a number of arrangements, including one or more of flow meters, optical sensors, and similar means.

The LM RF feed structure may have a common length $l_{res}$ and width $w_{res}$. The longer and less wide transport channels may have a common length $l_{chan}$ and width and $w_{chan}$, respectively. Both the channels and retained LM may have a common depth $d_{chan}$=$d_{res}$. In one embodiment of the invention, one of the two transport channels passes through a DC-driven MHD drive 30, shown more clearly in the inset of FIG. 30. FIG. 30 depicts a simple loop arrangement for the channels, which is useful when the channels are used to transport heat from a high temperature area to lower temperature heat sink. It is analogous to the looped configuration shown in FIG. 1A. However, with regard to a reconfigurable antenna 10, the channels 14, 15 may also be in a linear, non-looped arrangement an open, vented end (exit ports 23, 24) away from the LM reservoir 27 in order to release any air in the channels so that the LM flow in the channels 14, 15 is not restricted. In this instance, the exit ports 23, 24 are not intended to discharge LM 16, but only to vent air so that the LM 16 can move freely when pumped.

The MHD pump 30 may comprise two aligned permanent magnets 31 sandwiched between two thin ferromagnetic plates 32. This arrangement creates a strong and relatively constant fixed magnetic field in the region of the liquid metal channel 33 passing between, while also providing a relatively thin and highly tailorable design. Two electrodes 34 spanning the full depth of the channel 33 allow DC current to pass through the conductive fluid 16, where the highest current density exists between the two electrode plates 34. A critical dimension is the length of the electrodes 32 in the direction of the channel, $l_{elec}$. A volumetric Lorentz force is generated by the interaction of the current and the magnetic field, driving the fluid in a direction orthogonal to both (i.e., in the direction of the channel). This effect is illustrated in FIG. 3I, where realistic in-plane Lorentz force rotations induced by the non-uniform nature of the current density are shown. With regard to the MHD pump 30, design parameters such as electrode size, channel dimensions, and total driving current may be adjusted to meet desired performance characteristics.

RF Analysis

Figure 4A:
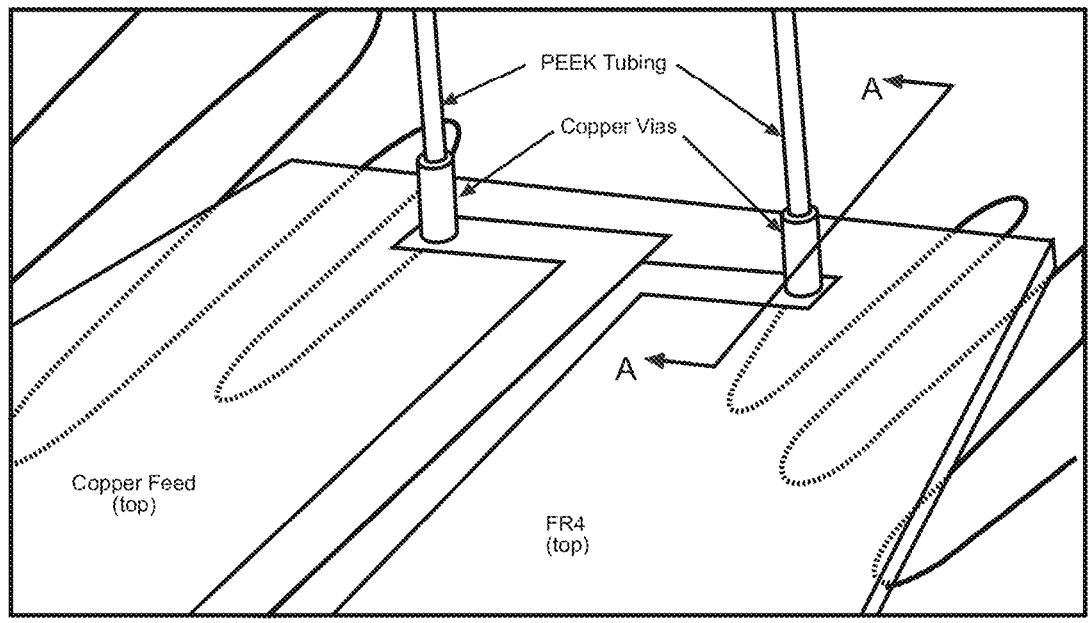
FIGS. 4A-4B illustrate a perspective view and a sectional view of the combined radio frequency (RF)/liquid metal (LM) feed structure, according to an embodiment of the invention.
Figure 4B:
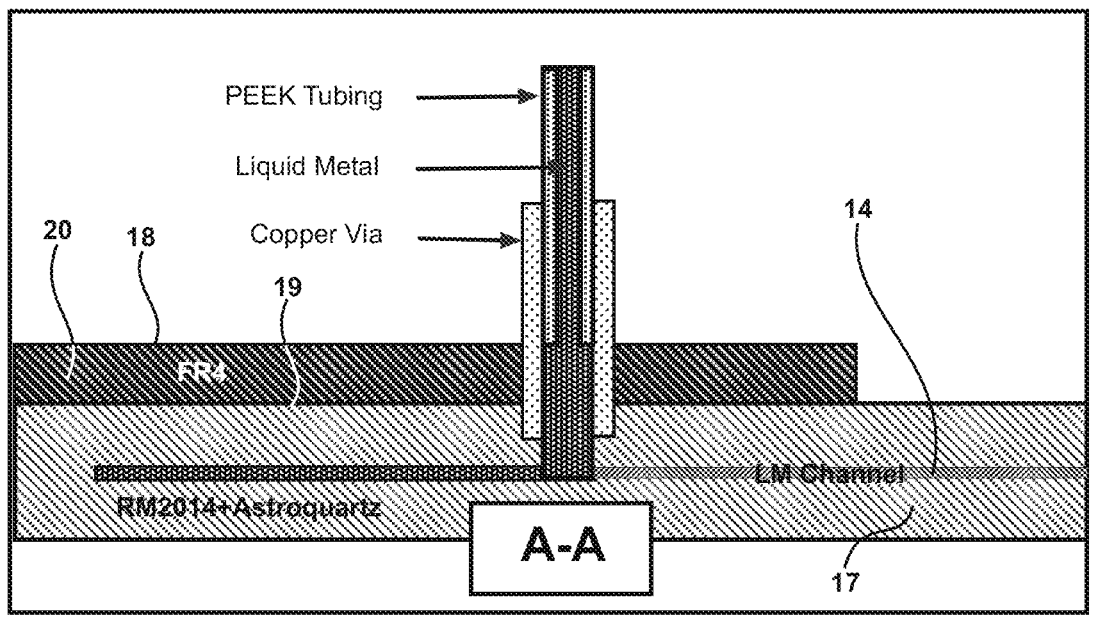

A schematic of the computational model used for RF analysis is presented in FIGS. 4A-4B, where the Astroquartz panel 17, FR4 feed material 20, copper microstrip feed 11, LM channels 14, 15, and a volume of air are all considered. The material properties assumed for the quartz fiber laminate are $\varepsilon=3.25$ and $\tan(\delta)=0.025$, where $\varepsilon$ and $\tan(\delta)$ represent the relative permittivity (real part) and loss tangent, respectively. For the FR4, $\varepsilon=4:10$ and $\tan(\delta)=0.020$. For the preliminary study shown herein, the EGaIn which comprised the LM traces (when filled) is modeled as having the conductivity of common solder ($k=7e^6$ S/m), which is ≈2× that reported for EGaIn. All other materials are assumed to be insulating and the relative magnetic permeability is assumed to be 1.0 for all materials.

SEVA Fabrication

Material Selection

The laminate material for the research effort was RM-2014/4581 Astroquartz® III Fabric (Renegade Materials). This is a low dielectric loss epoxy/quartz prepreg cured at 150-175° C. (300-350° F.) and having an 8-harness satin weave configuration. The sacrificial polymer used to create microchannels was in the form of VascTech filament (1.75 mm), a tin (II) oxalate catalyzed polylactic acid (cPLA) purchased from CU Aerospace. The incorporation of SnOx catalyst into PLA filament permits thermal depolymerization at lower temperatures, providing the critical advantage of reducing thermal degradation of the composite resin matrix during the required post-cure (see below). The liquid metal alloy used was eutectic gallium-indium (Sigma-Adrich) with a composition of 75.5% Ga and 24.5% In (by weight).

FDM Printing of Sacrificial Channel Templates

A CAD model for the single-pass (i.e., non-rastered) SEVA-ES pattern was uploaded as a STereoLithography (.stl) file to an nScrypt 3Dn-500 printer running Slic3r (version 1.2.9) and A3200 Motion Composer (Aerotech, Inc.). Sacrificial templates of the sinusoidal LM channel paths and an aligning frame using as-received VascTech filament were printed onto 0.05 mm thick Kapton™ sheet using a 0.60 mm ID ceramic extrusion nozzle maintained at 194-195° C., with a 0.6 mm layer height, a 20 mm/s print speed, an extrusion width of 0.4 mm, and a 1.5 extrusion multiplier. The build plate was maintained at 90° C. The Kapton™ sheet served as a build surface during FDM printing and as a transfer sheet during the composite panel layup stage. After printing, a hand caliper was used to measure the dimensions of the sinusoidal printed paths; heights and widths were found to be 0:45 mm each.

Figure 5:
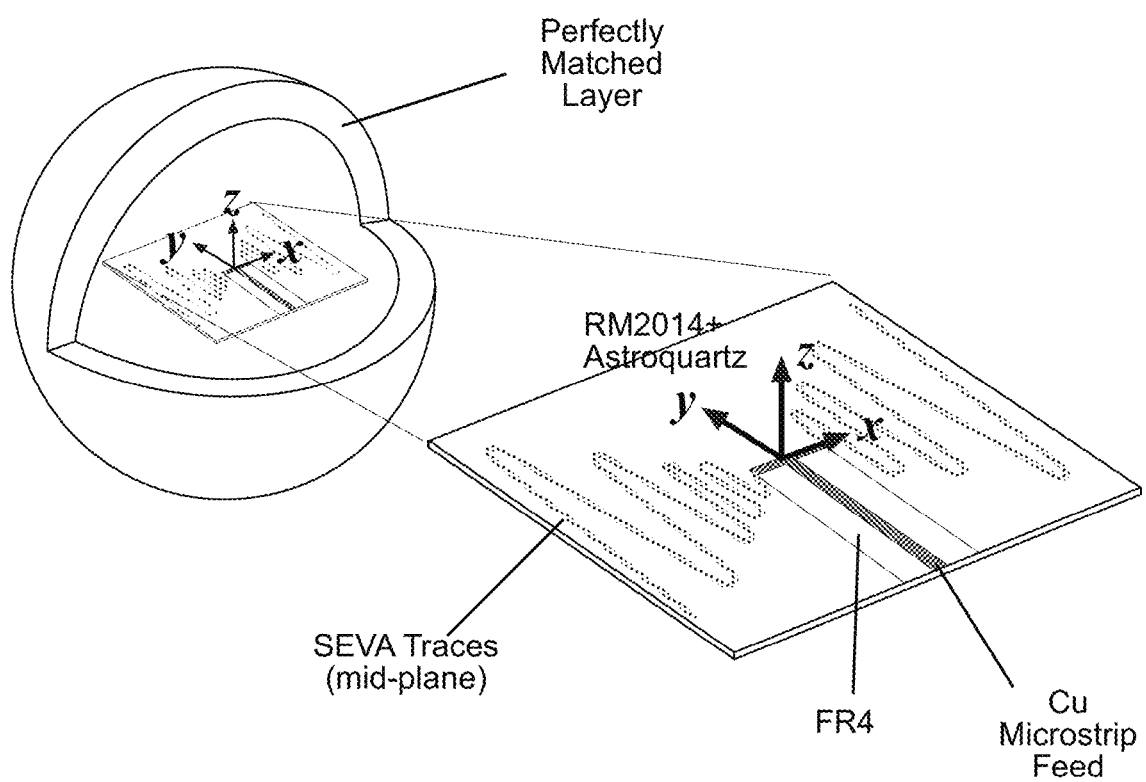
FIG. 5 illustrates the computational assumptions used to model the RF response of SEVA traces using the literature properties of liquid metal, according to an embodiment of the invention.

FIG. 5 is an illustration of the computational assumptions of a perfectly matched RF layer that is used to model the RF response of SEVA traces using the literature properties of liquid metal.

Microvascular Composite Laminate

Figure 6:
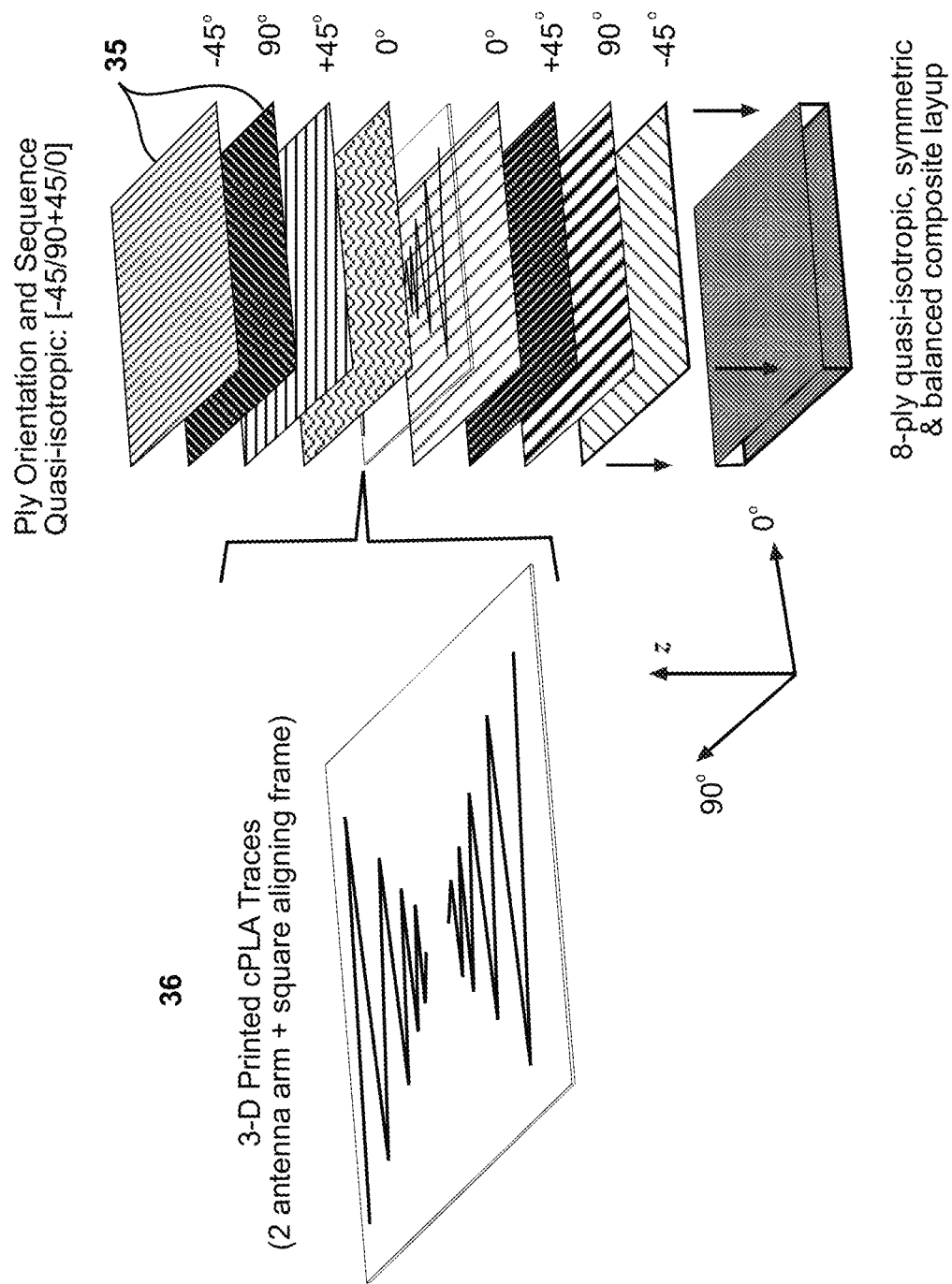
FIG. 6 depicts the layers utilized in a reconfigurable liquid metal antenna, according to an embodiment of the invention; either woven or unidirectional composite layers with defined fiber orientation are integrated with the printed cPLA inclusion into stacked laminate and consolidated; cPLA traces (sinusoidal paths and aligning frame) fabricated using a 3-D printer are placed at the mid-plane of an eight-ply, quasi-isotropic, symmetric, and balanced laminate.

The full ply stack (layup) consisted of eight epoxy/quartz fabric plies 33 of RM-2014/4581 Astroquartz® III fabric, each 165 mm×180 mm×2.24 mm, as shown in FIG. 6. With respect to FIG. 6, a woven composite laminate configuration includes traces 34 of cPLA (sinusoidal paths and aligning frame) which may be fabricated using a 3-D printer and may be placed at the mid-plane of an eight-ply, quasi-isotropic, symmetric, and balanced laminate, as illustrated in FIG. 6.

The eight laminae may be stacked in a quasi-isotropic $[-45/90/+45/0]_s$ sequence, as depicted in FIG. 6. After the first four plies are laid, a Kapton™ transfer sheet hosting the printed sacrificial template was inverted and the cPLA template was thermally transferred (i.e., ironed) onto ply four; a thin cotton cloth may be used as a buffer between the iron and the Kapton™. Care should be taken to avoid softening and deformation of the printed cPLA template during the thermal transfer process.

The temperature of the iron is typically 73-90° C., well below the 165° C. melting point of the cPLA sacrificial material. Other temperatures may be utilized as long as the materials/pattern are not damaged or altered. Once adhesion between the template and fourth ply is confirmed, the Kapton™ sheet is removed and the remaining four plies are sequentially laid, completing the laminate 35. An outer vacuum bag may be prepared for the laminate stack, and an autoclave cycle may be used to initially cure the composite. The ply stack was de-bulked in a vacuum of 760 mmHg for 30 min. A positive pressure of 0.55 MPa was then applied and the temperature was ramped from room temperature to 135° C. (275° F.) at 2° C./min. The vacuum was then released and this state was maintained for 4 hours, after which the autoclave was cooled at a rate of 5° C./min to 24° C. (75° F.).

Figure 7:
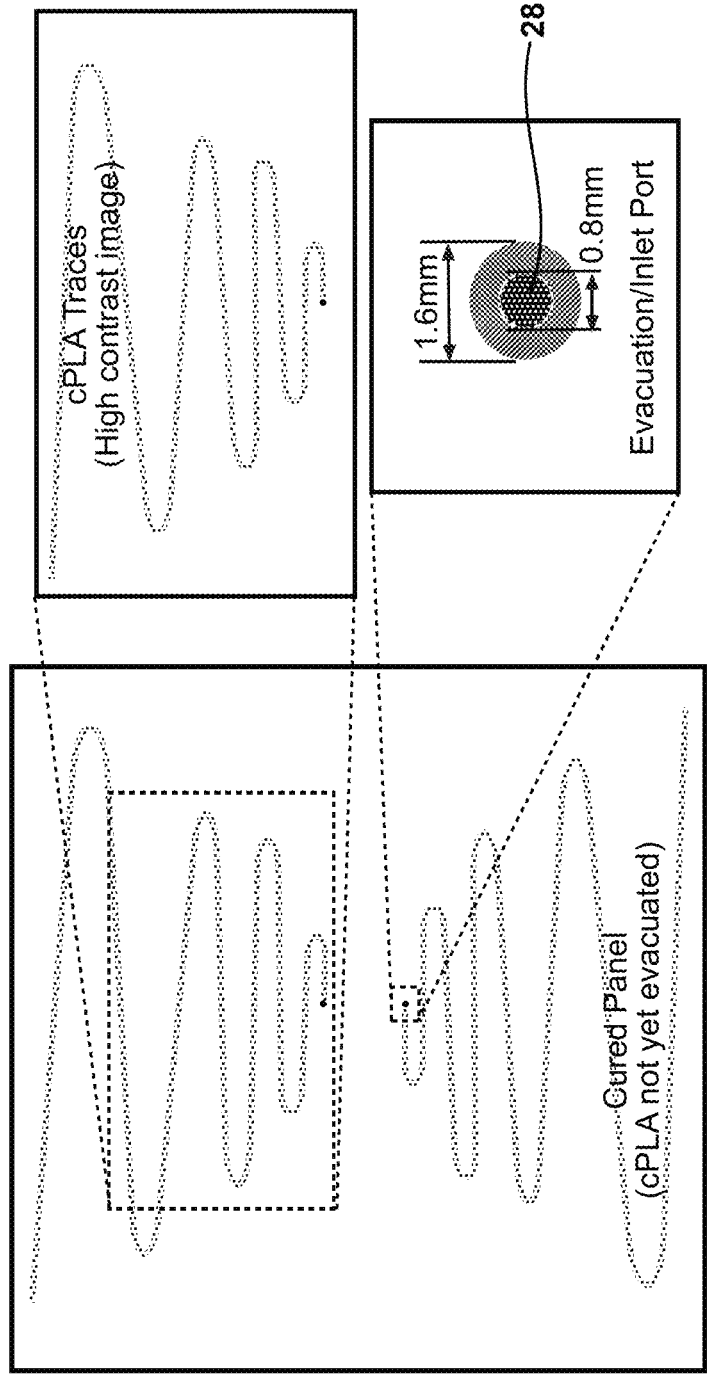
FIGS. 7A-7C illustrate a fabricated antenna panel after laminate cure and drilling of the LM inlet/outlet ports, which also provide a means of evacuating the cPLA during subsequent post-cure, according to an embodiment of the invention.

After cure, the panels may be trimmed with a wet diamond saw to a final dimension, e.g. 152 mm (6 inches) squared. A panel after completion of the laminate cure cycle is shown in FIG. 7A. Note the embedded cPLA material, visible through the translucent RM-2014/4581 Astroquartz® of FIG. 7B, and the evacuation/inlet port features of FIG. 7C.

Liquid Metal/RF Feed and cPLA Evacuation Ports

Figure 8:
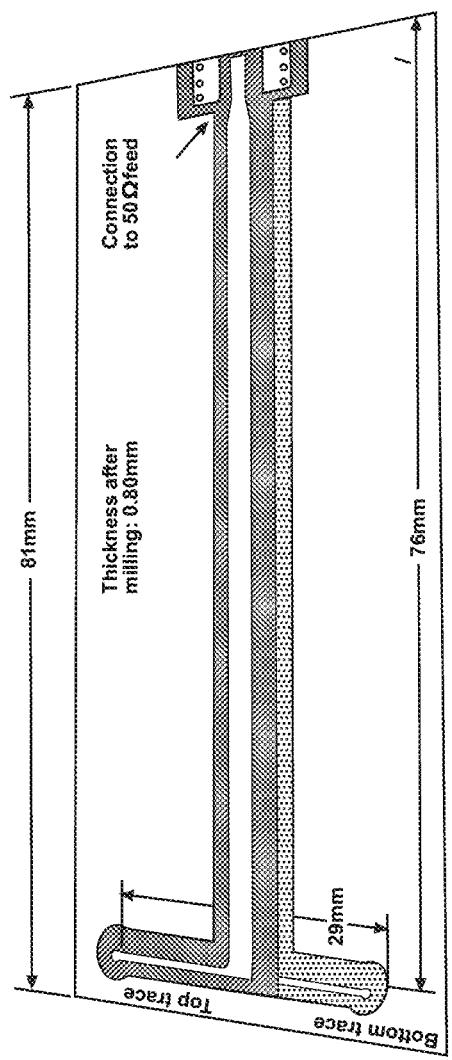
FIG. 8. illustrates a fabricated RF feed panel after milling of copper traces and prior to drilling of the LM inlet/outlet ports (see FIGS. 2-3), according to an embodiment of the invention.

The feed panel (FIG. 8) may be fabricated from an initially copper clad FR-4 panel with a thickness of 0.88 mm. Cladding may be selectively removed via an automated milling process to produce microstrip lines, 3.2 mm wide by 76 mm long. The microstrip lines are used to connect the LM antenna arms to a standard 50 Ω feed. Before evacuation of cPLA to produce the antenna panel micro-channels, 0.9 mm diameter holes 28 (see FIG. 7C) were drilled into the antenna panel 17 to the depth of the microchannels (1.37 mm deep) and were additionally counterbored to 1.6 mm diameter (0.51 mm deep) to allow insertion of the 1.6 mm diameter copper vias 26, 27 (see FIG. 3). An example of the final feed port prior to inlet/outlet port insertion can be seen in FIG. 7C.

The drilled ports 28 (absent any installed tubing) may allow for evacuation of cPLA during post-cure. Complementary 1.6 mm holes were drilled into the feed panel 11; these allow for electrical connection between the EGaIn and the microstrip feed 11 by way of the copper vias 26, 27. Installation of PEEK tubing 29 mating to the copper vias 26, 27 allows ingress/egress of fluids, e.g. liquid metal 16, during antenna operation; EGaIn may be pumped into the system from an external connection point 27. Note that the outlet ports 23, 24 are generally not used for the transfer of EGaIn, but rather provide venting during ingress/egress of fluid through the centralized feed structure.

Evacuation of Sacrificial Material and LM Channel Creation

To create microchannels, a modified vaporization of sacrificial components (VASC) technique was used. After machining the evacuation/feed ports 21, 22, 23, 24 and removal of associated debris, the cPLA polymer may be evacuated from the cured SEVA-ES panels via gravity-assisted sublimation. The oven temperature was first increased to 200° C. over the course of at least 45 min at ambient pressure before the panel was introduced. To take advantage of the forces of gravity in evacuating the channels, the panel may be inverted (ports down) and placed on supports above an aluminum plate. The plate, supports, and panel are placed into the oven; a thermocouple is installed on the plate to monitor the temperature locally during channel evacuation. Once the oven temperature re-equilibrated at 200° C. and a vacuum of 46 mmHg was reached, this state was maintained for 6 hours to achieve full evacuation of the cPLA. After completion of this step, the oven set temperature is reduced to room temperature and the panel is allowed to furnace cool to room temperature while still under vacuum. Once ambient temperature is reached, the panel is removed and the newly-formed micro-channels tested for patency.

To test for patency, microvascular channels were first filled and flushed with ethyl alcohol, after which the alcohol was removed using pressurized air. The patency test was qualitative and visual in nature. Evacuated (empty) channels are observed to be darker than the host composite; positive patency is associated with both the ability to flow alcohol from inlet to outlet, and also the observed uniform change in channel appearance from dark to light as it is filled with alcohol. The flow of pressurized air removes the alcohol and returns the channel to its unfilled state and dark appearance.

Experimental RF Characterization and Comparison With Analysis

To assess in a preliminary manner the feasible operation of the SEVA-ES and in particular its ability to reconfigure based on the flow of EGaIn, a vector network analyzer was used to assess the input reflection coefficient of the fabricated SEVA-ES in two states: unfilled and partially filled. Given the design of the feed panel, an unfilled antenna corresponds to a simple dipole configuration (e.g. FIGS. 1A-1B), while partially filled describes a state in which a single full period of both sinusoidal patterns (poles) are filled with EGaIn. A scan from 1.5 to 4.5 GHz was performed, and the reflection at the 50 Ω port was compared to that calculated according to the method disclosed above under "RF Analysis". The comparisons are presented in FIGS. 9A-9B.

Figures 9A, 9B:
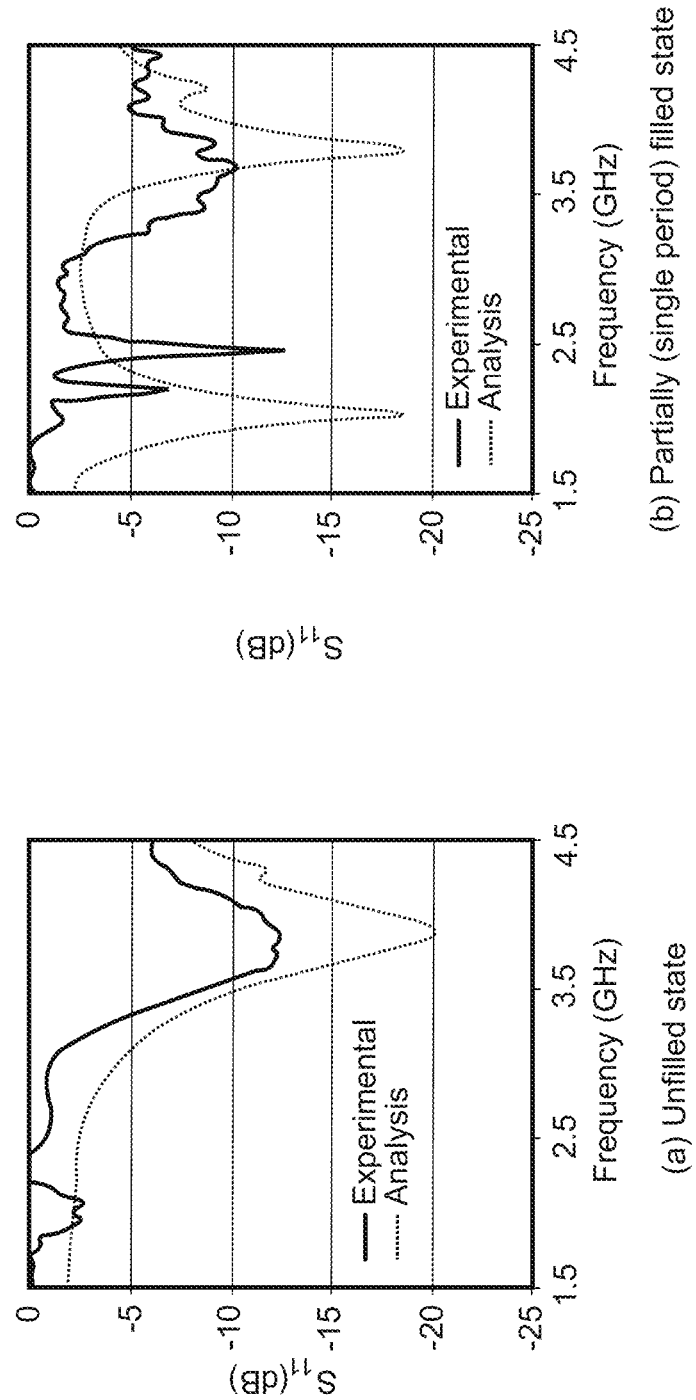
FIGS. 9A-9B depict comparisons of the input reflection coefficient $S_{11}$ (in dB) for SEVA-ES antenna in unfilled (reference) and example partially-filled state, according to an embodiment of the invention.

In FIG. 9A, we see that the resonance of the reference (unfilled) antenna at ≈4 GHz is generally well predicted. Upon filling the first period of the sinusoidal dipole with LM (see FIG. 9B) and thus increasing the length of the radiating elements, a second resonance at lower frequency of ≈2-2.5 GHz appears. Though the bandwidth of this retuned resonance is over-predicted by the idealized computational model, the ability of the novel fluid-electrical feed structure (see above) to provide excitation to the LM-based antenna and the effects of altering antenna configuration in situ are each demonstrated.

FIGS. 10-29 illustrate the manufacture of a curved composite SEVA, according to embodiments of the invention. The desired geometry for the embedded meandering antenna pattern may be first printed as a template using a sacrificial VascTech filament (tin (II) oxalate catalyzed polylactic acid (cPLA)). The design may be printed with an nScrypt 3Dn-500 printer as a single trace onto a Kapton® sheet using the following parameters: 195° C. extrusion temperature, 0.6 mm diameter tip, 0.6 mm layer height, 20 mm/s print speed, extrusion width of 0.4 mm, and a 1.5 extrusion multiplier. The Kapton® sheet serves a dual purpose: as a build surface during printing and as a transfer sheet during the composite layup. The full layup may consist of eight 2.24 mm thick plies of RM-2014/4581 Astroquartz® III fabric, a low dielectric epoxy/quartz prepreg. More or fewer layers may be utilized, depending upon the desired performance characteristics of the finished panel.

Figure 10A:
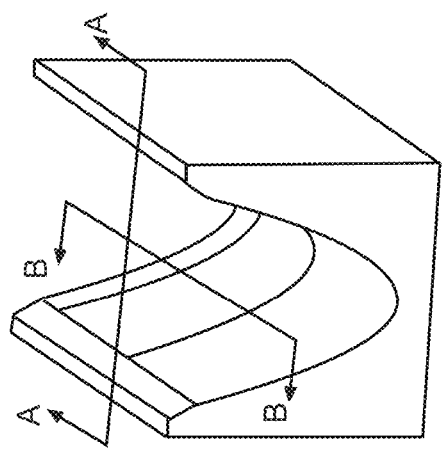
FIGS. 10A-10C depicts a tool used to create complex curved microvascular laminates having a parabolic-like cross-section and a slight central saddle point, according to an embodiment of the invention.
Figure 10C:
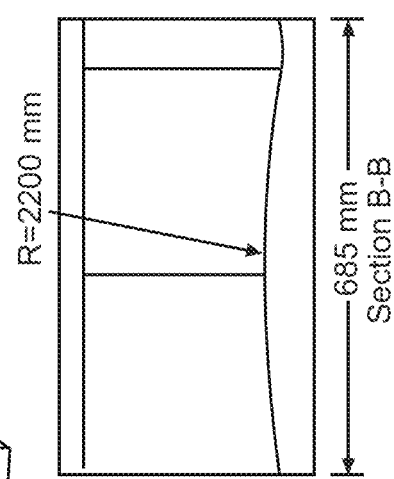
Figure 10B:
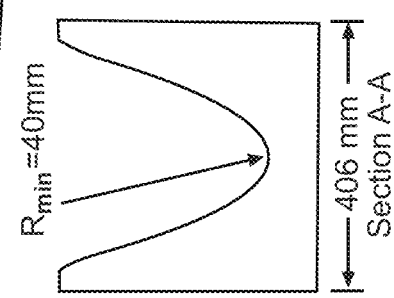

FIGS. 10A-10C illustrate a complex female aluminum tool/form (see FIG. 10A) having a maximum radius of 2200 mm along section B-B (see FIG. 10C) and a saddle point configuration with a 40 mm radius along section A-A inverted curvature along the trough region shown in FIG. 10B. The tool and the prepreg (e.g., RM-2014/4581 Astroquartz® III fabric, a low dielectric epoxy/quartz prepreg) are heated to between about 60° C. and 70° C. to improve the conformability of the prepreg and resulting laminate to the mold. The laminate is degassed after each application of two plies using a bagging configuration similar to that shown in FIG. 11. The additive-printed VascTech pattern may be inserted after the first four plies for the eight-ply complex-curved laminates. In the case of a thin, four-ply laminate, the VascTech pattern may be inserted after the second ply. The pattern is transferred by inverting the Kapton sheet with the printed pattern onto the prepreg stack. The tackiness of the heated prepreg assists with the transfer of the cPLA pattern to the prepreg stack. The Kapton® sheet is then removed and the remaining plies and debulk steps are applied to complete the lamination. The full stack may be debulked for about 30 min and autoclave cured at 135±10° C. and about 100 psi pressure for about 4 hr. After curing, the panel may be trimmed, e.g. with a wet diamond saw, to the desired final dimensions.

To investigate the characteristics of the cPLA evacuation process, two sections of the 4-ply curved composites were sectioned and drilled with 1.6 mm through-holes at various locations along the embedded cPLA pattern. The composites were mounted vertically within a vacuum oven and the evacuation process was observed through the window of the vacuum oven as a function of time at an oven set-temperature of 190° C. and 200° C., respectively. Image analysis was performed on the resulting video to better understand the cPLA extraction process.

As described above with regard to FIGS. 3-4B, the invention includes a feed network for communicating with the liquid metal in the channels. The feed network may comprise 50 Ω parallel-strip feed lines of width $w_f$=2.7 mm which may be fabricated on an FR4 substrate ($\varepsilon_r$=4.4, Tan δ=0.02) of height $h_f$=31 mil (0.7874 mm). In this example, the feed lines extend 1 cm beyond the edge of the composite in the x-direction where they are terminated in a PCB end-launch SMA connector (including vias for connecting the ground pins and pads), for connection to measurement cables. This transition may be used in place of a (tapered, etc.) microstrip-to-parallel strip transition. FIGS. 3, 4A, and 4B illustrate detailed views of the feed network where it terminates in an antipodal dipole with arm lengths $s_0$=10.0 mm and widths $w_d$=$W_f$. The purpose of this antipodal dipole is to act as a balun-like transition from the coplanar strips to a dipole antenna topology, e.g. LM in channels. The antipodal dipole also provides physical separation between the two hollow metallic vias 26, 27 (inset shown in FIG. 3) that serve as vertical interconnects between the antipodal dipole and the SEVA-RL. These vias 26, 27 may also be used to insert liquid metal 16 into the SEVA-RL and thus to physically reconfigure the antenna 10. The feed network 11 was designed in concert with the SEVA to provide a balun-like transition in the form of an antipodal dipole and to create physical spacing between the insertion points for liquid metal. These two substrates 12, 13 are aligned and mechanically fastened, e.g. by drilling both substrates and tapping to the threading of the nylon screws.

Reconfiguration of the SEVA

Physical reconfiguration of the SEVA-RL is first achieved through filling the channel of each element to the same level (parameter t). Increasing t corresponds to the insertion of additional EGaIn into the channels. This parameter extends from t=0 (the edge of the antipodal dipole) to the perimeter of the substrate at t=2.675 in simulation and to fluid extraction vias located at t=2.6 in one embodiment. In a simple approximation, the physical reconfiguration of the antenna from the insertion of EGaIn in the channel is expected to facilitate an increase in the electrical length of the individual dipoles. This has the explicit goal of enabling each element a downward shift in the 2:1 VSWR impedance bandwidth of the first radiating dipole mode. Both of the SEVA-RL channels may be initially filled with the low-dielectric low-loss heat transfer fluid Fluorinert FC-70 Electronic Liquid. An appropriately-tipped syringe may be used to inject liquid metal into the channels. In the alternative, the interior surfaces of the LM channels may be treated with a layer of phosphonic acids to promote the smooth flow of the LM.

EM Measurements

The EM performance of each element was measured using A SOLT calibration from 200 MHz to 5 GHz in 1 MHz steps with a 5 kHz IF bandwidth was performed for impedance measurements. The input reflection coefficient (in place of VSWR) is provided for comparison between measurement and simulation (with equivalent de-embedding). The curved panel was held upright during radiation pattern measurements. This fixture provided access to measurements of the xz- and yz-planes. Simulated and measured patterns were normalized independently.

Structurally Embedded Vascular Antenna

There are a variety of approaches to form unlined vascular passages within a structural composite. One embodiment is the use of a sacrificial tertiary phase which is removed after matrix curing. Based on the flexibility to write a range of patterns for insertion into complex shaped structures, additive printing of a sacrificial catalyzed polymer is advantageous. An additively-printed poly(lactic acid) filament with embedded tin oxalate catalyst (cPLA) to enhance the sublimation process, this microchannel fabrication method comprises depolymerization of the embedded sacrificial polymer. Removal of the sacrificial polymer yields channels.

Typically, voids within a polymer composite are avoided due to the substantial degradation in resin-dominated properties. Depending on their orientation, some mechanical properties can be degraded by the presence of structured voids (i.e. micro-channels) while others are improved. For example, microvascular channels which are not parallel to fiber lamina may displace fiber tows, decrease the fiber volume of the ply, and produce resin-rich pockets. Yet, orienting channels fully perpendicular to adjacent fiber tows may increase the mode I toughness. Conversely, channels that run parallel to adjacent fiber lamina and are sufficiently small to nest themselves within the ply may provide an insignificant change to mechanical properties. Mechanical degradation of larger, non-parallel channels may be minimized by placing them in a "notch" between adjacent plies. In one embodiment, microchannels are nested within an 8-harness satin weave of RM-2014/4581 Astroquartz® III fabric composite.

Additive Printing of Sacrificial Polymer Filament and Composite Materials

The desired geometry for the embedded meandering antenna pattern may be first printed as a template using a sacrificial VascTech filament (tin (II) oxalate catalyzed polylactic acid (cPLA)). The design may be printed with an nScrypt 3Dn-500 printer as a single trace onto a Kapton® sheet using the following parameters: 195° C. extrusion temperature, 0.6 mm diameter tip, 0.6 mm layer height, 20 mm/s print speed, extrusion width of 0.4 mm, and a 1.5 extrusion multiplier. The Kapton® sheet serves a dual purpose: as a build surface during printing, and as a transfer sheet during the composite layup. The full layup may comprise eight 2.24 mm thick plies of RM-2014/4581 Astroquartz® III fabric, a low dielectric epoxy/quartz prepreg. To determine the optimal conditions for removing the cPLA filament, e.g. by sublimation, identical prints of the cPLA were placed into a vacuum oven at 190° C. and 200° C., and the material was observed both before and after thermal treatment and measured to determine the corresponding weight loss.

Processing and Mechanical Testing of Planar Microvascular Composite

In one evaluation, 6×6-inch square planar panels were fabricated were made using 300 μm and 500 μm diameter VascTech fiber rather than the additively-printed VascTech filament. Eight plies were flat-stacked in a quasi-isotropic $[-45/90/+45/0]_s$ sequence with a VascTech fiber placed at the mid-ply, resulting in a microchannel volume fraction of approximately 0.3%. The full 8-ply stacks were debulked for 30 minutes followed by an autoclave cure at 135±10° C. for 4 hr. After curing, the panels were trimmed with a wet diamond saw to final dimension of 152 mm squared, resulting in ends of the cPLA filaments being exposed. The cPLA was removed using a vacuum oven post-cure with material departed from the exposed ends. The panels were kept in a planar configuration for a 6 hour, vacuum oven post-cure at 200±10° C. and 30.5 mm Hg. Rectangular tensile and 3-pt flexural test specimens (12.5 mm wide by 152 mm long) were machined from the fabricated panel. Tensile specimens with a $[-45/90/+45/0]_s$ ply orientation were tested at a strain rate of 0.007/minute until failure. Strain was recorded using an extensometer with 1-inch gauge section. Flexural specimens with a $[45/0/90/-45]_{2s}$ and a $[0/\pm45/90]_{2s}$ ply orientation were tested per ASTM D-7264. Flexural specimens were tested with no channels and with 500 μm channels at the mid-plane.

Figure 11:
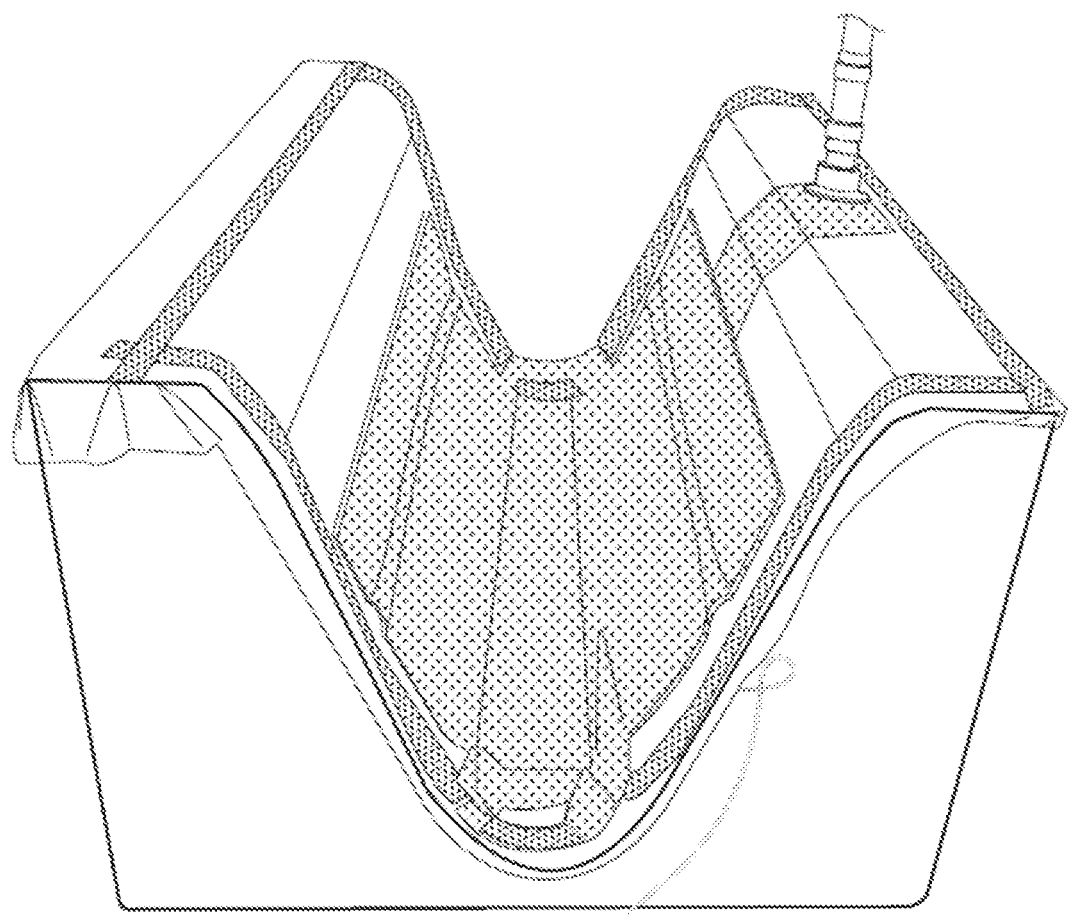
FIG. 11 illustrates a forming tool in a vacuum bag prior to curing, according to an embodiment of the invention.

FIGS. 10A-11 depict a tool/form which may be used to create complex curved microvascular laminates having a parabolic-like cross-section and a slight central saddle point. A complex female aluminum tool having a maximum radius of 2200 mm and a saddle point configuration with a 40 mm radius inverted curvature along the trough region is shown in FIGS. 10A-11. The tool and the prepreg were heated to between 60 and 70° C. to improve the conformability of the laminate to the mold. The laminate was degassed after each application of two plies using a bagging configuration similar to that shown in FIG. 11. The additive-printed VascTech pattern was inserted after the first four plies were laid, i.e. in the center of the layup, for the 8-ply complex curved laminates. A 4-ply laminate was also made in order to better observe the evacuation process, wherein the VascTech pattern was inserted after the second ply. The pattern was transferred by inverting the Kapton® sheet with the printed pattern. Onto the middle of the laminate stack. The tackiness of the heated prepreg assisted with the transfer of the cPLA pattern to the prepreg stack. The Kapton® sheet was removed and the remaining plies and debulk steps were applied to complete the lamination. The full stack was debulked for 30 minutes and autoclave cured at 135±10° C. and 100 psi pressure for 4 hr. After curing, the panel was trimmed with a wet diamond saw to the desired final dimensions.

Figure 12A:
FIGS. 12A-12B depict Optical Microscope Images of 300 μm diameter cPLA (FIG. 12A) and 500 μm diameter cPLA (FIG. 12B) circular cross-section cPLA filaments after post-cure/evacuation, according to an embodiment of the invention.
Figure 12B:
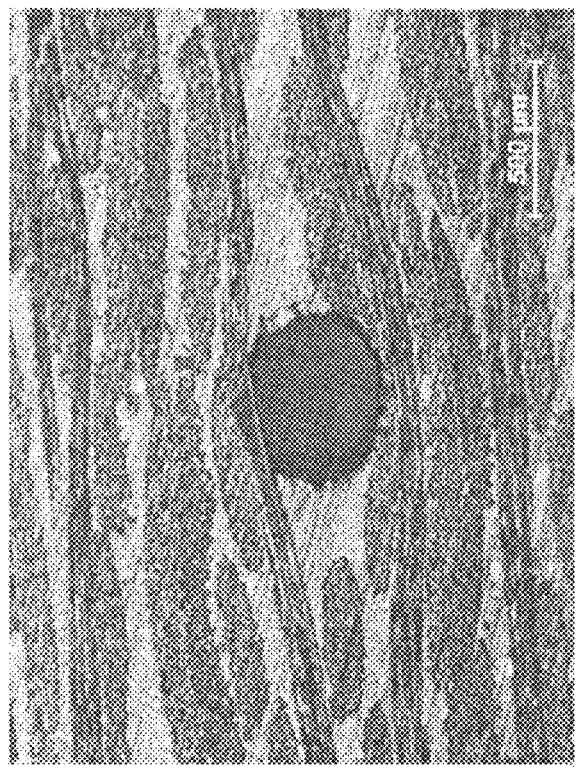

To investigate the characteristics of the cPLA evacuation process, two sections of the 4-ply curved composites were sectioned and drilled with 1.6 mm "through" holes at various locations along the embedded cPLA pattern. It was mounted vertically within a vacuum oven and the evacuation process was observed and recorded through the window of the vacuum oven as a function of time at oven set temperatures of 190° C. and 200° C., respectively. Image analysis was performed on the resulting video to better understand the cPLA extraction process. FIG. 11 depicts an exemplary bagged tool/form prior to curing Planar Microvascular Panel Fabrication and Mechanical Testing With regard to the specimens with 300 μm and 500 μm circular VascTech fiber extracted at 200° C., small pools of cPLA were observed around each outlet hole. This suggested that the solid cPLA had not completely sublimed to a gas, but had a significant liquid state. This was not expected and provided another problem to overcome. The resulting channel sections were not obstructed and their diameter closely matched the shape of the filament despite potential distortion due to autoclave pressure. FIGS. 12A-12B depict Optical Microscope Images of 300 μm diameter cPLA (FIG. 12A) and 500 μm diameter cPLA (FIG. 12B) circular cross-section cPLA filaments after post-cure/evacuation. As illustrated in FIGS. 12A-12B, both the 300 μm (FIG. 12A) and 500 μm (FIG. 12B) diameter filaments fully retained the initial circular cross section shape and were well nested within the 8-harness satin weave. Other studies (not shown) indicated that the 300 μm fiber diameter was consistently unperturbed, while the 500 μm diameter fiber was occasionally distorted into a slight oval shape with 8% compression of the vertical dimension to a height of 470 μm. Using more plies and leaving the caul plate off of one surface during autoclave processing allowed for thicker, larger microchannels to be formed without distortion. In both cases, the plies of the 8-harness satin weave allowed the tows to move around the channel to provide a well nested channel.

Perhaps due to the good nesting of the microchannel, the tensile stiffness strength of the panels with 300 μm and 500 μm diameter transverse microvascular channels were essentially equal to that of the composite with no microchannel present. The uniaxial tensile modulus with and without channels was 2.67±0.02 Msi. Tensile strengths were 68.9±1.3 ksi (no channel), 72.1±0.6 ksi (300 μm channel), and 63.7±1.6 ksi (500 μm channel), showing that there was an 8% decrease in strength with a 500 μm channel. The 5% increase in strength for a 300 μm channel over the sample with no channels may not be significant in comparison to the variability in the material. Very similar tensile loading curves are displayed for the 500 μm diameter microvascular composite, a composite without microchannels, and an ABAQUS modeled result in FIG. 13. Subjecting the laminates to post-cure at elevated temperature also resulted in no measurable decrease in strength or stiffness in shear or tension. Similarly, the flexural strength of the microvascular composite with 500 μm channel at the midplane (162.4 ksi±10.1 ksi) was essentially equal to that of the composite with no microchannel present (159.3 ksi±6.6 ksi) for a $[45/0/90/-45]_{2s}$ laminate. The $[0/\pm45/90]_{2s}$ laminate showed no statistical difference between the flex strength of 500 μm microvascular composites (139.3 ksi±2.1 ksi) and the composite with no microchannel present (139.6 ksi±4.5 ksi).

Figure 13:
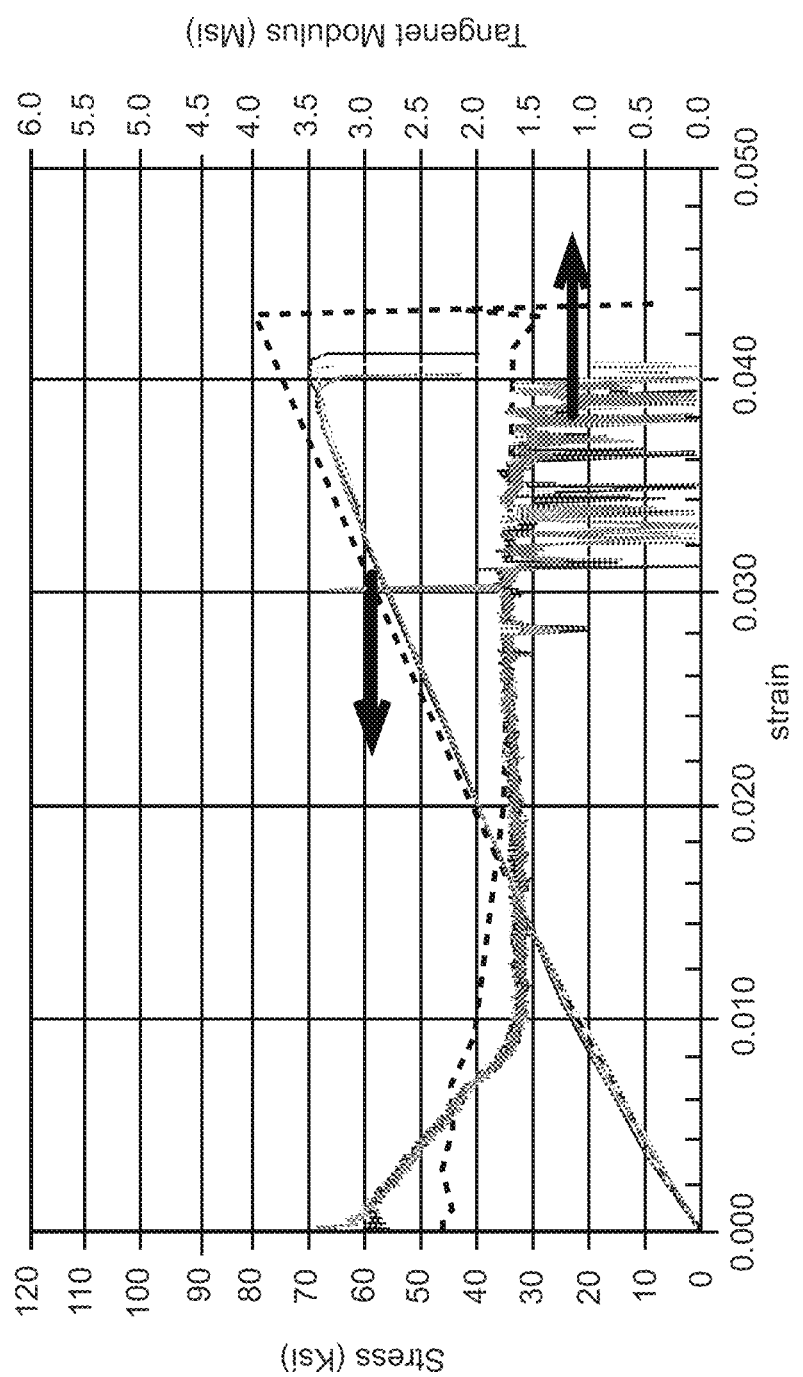
FIG. 13 illustrate the measured uniaxial tensile strength (left axis) and tangent modulus (right axis) of 500 μm microvascular and reference composite (solid colored lines). ABAQUS-modeled result (black dashed lines) for a quasi-isotropic laminate measured perpendicular to the microchannel direction, according to an embodiment of the invention.

FIG. 13 illustrates measured uniaxial tensile strength (left axis) and tangent modulus (right axis) of 500 μm microvascular and reference composite (solid colored lines). ABAQUS modeled results (black dashed lines) are presented for a quasi-isotropic laminate measured perpendicular to the microchannel direction.

Additive Printing of cPLA and Curved Panel Fabrication

Figure 14B:
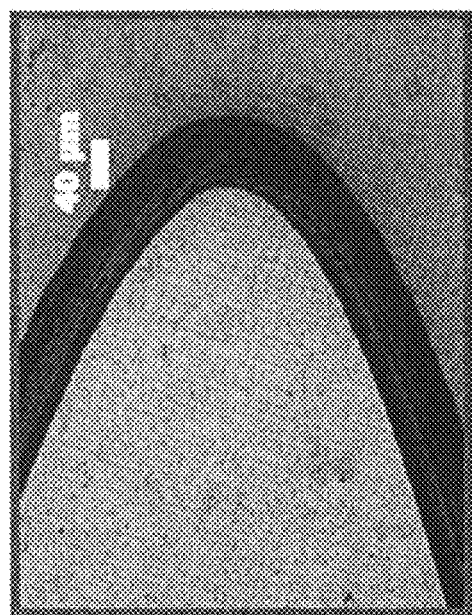
FIGS. 14A-14C depict additive printing cPLA traces in an antenna pattern on a Kapton® sheet for subsequent incorporation into laminated composites, curing, and removal during post cure, according to an embodiment of the invention.
Figure 14C:
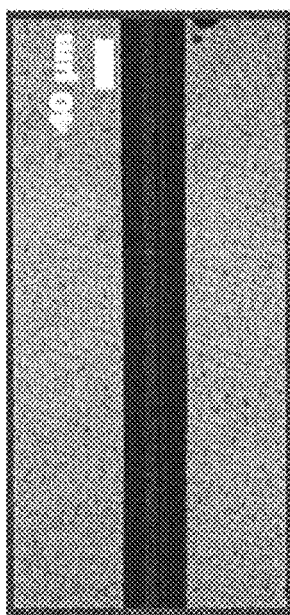
Figure 14A:
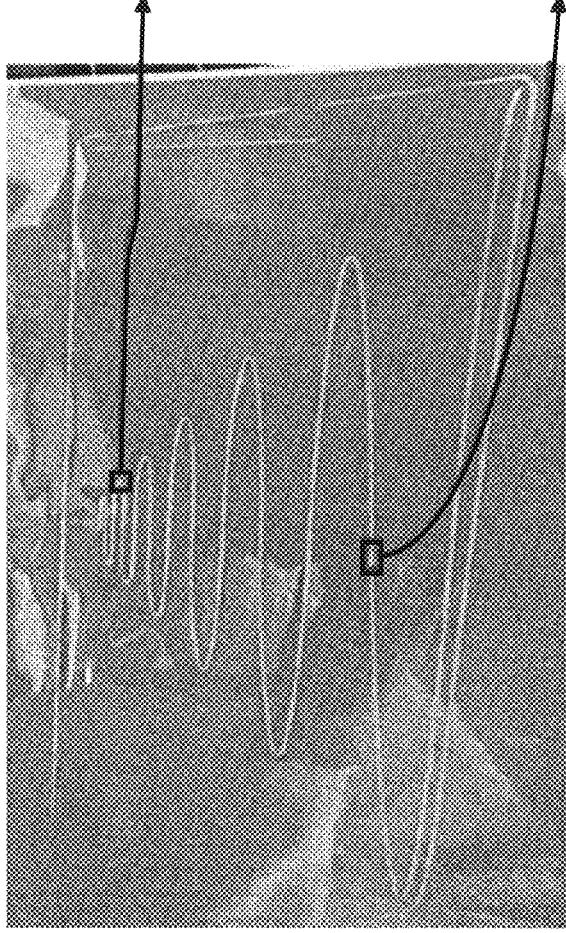

The additively-printed cPLA used for generating the embedded microchannels may be printed in a single pass and resulted in channels with a uniform oval-shaped cross section. The average road dimensions are 0.45±0.01 mm in height and 0.57±0.02 mm in width. A typical single-pass printed pattern on a sheet of Kapton® is shown in FIG. 14A. FIGS. 14B-14C demonstrate that uniform sections that were achieved, even in regions where the radius of curvature was reasonably tight relative to the width of the pattern.

Figure 15:
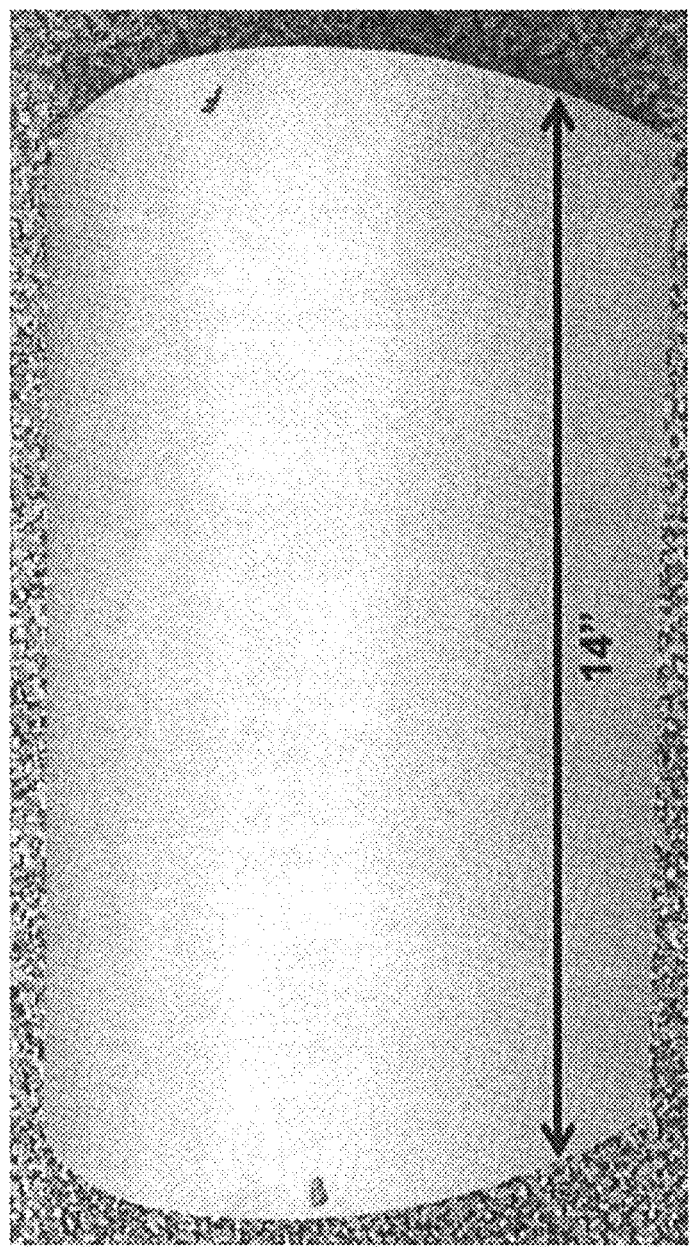
FIG. 15 depicts a fabricated curved panel with center saddle point of an 8-ply RM-2014/4581 Astroquartz® III fabric composite with integrated additively-printed sinusoidal cPLA pattern, according to an embodiment of the invention.

FIG. 15 depicts a fabricated curved panel with center saddle point of an 8-ply RM-2014/4581 Astroquartz® III fabric composite with an integrated additively-printed sinusoidal cPLA pattern. The curved panel article resulting from processing an 8-ply additive-printed insert shows a full sinusoidal-like array prior to removal of the cPLA. The dimensions of the final article were observed to closely match those of the provided tool with only a slight spring in of the legs.

cPLA Removal in Microvascular Curved Panel Fabrication at 190° C.

It was theorized from the observations of the evacuation of the mechanical testing panels (see above) that using gravity to assist the exit of cPLA during evacuation may be helpful to clear the channels more effectively. During and after processing of the previously-mentioned 4-ply curved section (see above) within a vacuum oven, the evacuation of the cPLA may be observed as a function of time at an oven set temperature of 190° C. However, the observation of a significant amount of liquid weeping out of the drilled holes appeared to confirm the hypothesis that the most or much of the cPLA did not directly sublime to a gas at this temperature. Instead, the cPLA passed through a significant liquid phase whose transport was largely gravity driven. Closer inspection of the channels with image contrast enhancement was able to roughly quantify the evacuation of the channels and estimate the volume loss as a function of time. The percent volume loss by optical imagery, the weight loss by TGA, and the optical image of the panel as a function of time at 190° C. is presented in FIG. 17. Note that roughly 10% of the material remains in the microvascular composite as measured by optical imagery, indicating an incomplete evacuation. When tested, each segment between drilled holes was blocked with retained material.

Figure 16:
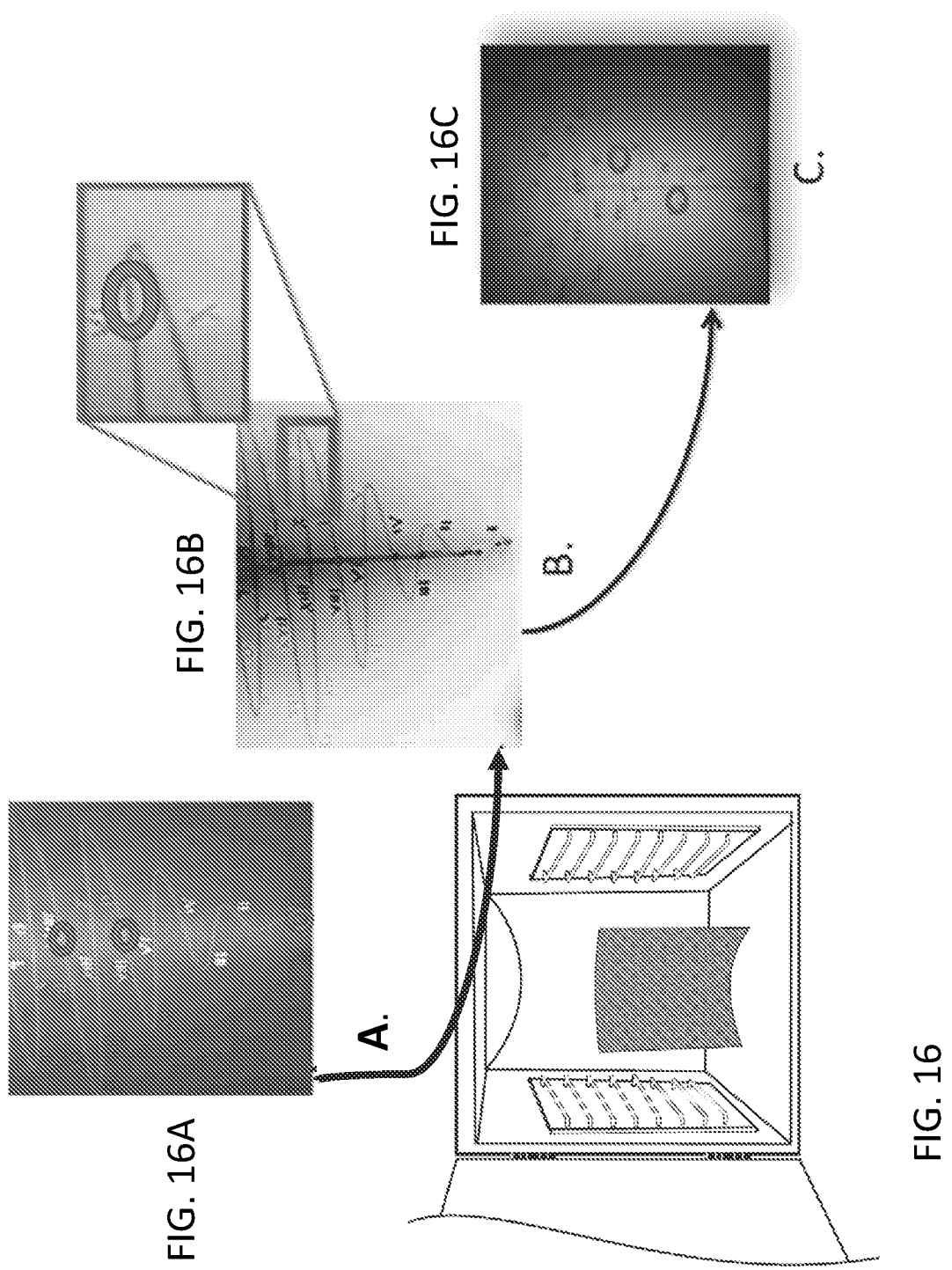
Figure 17:
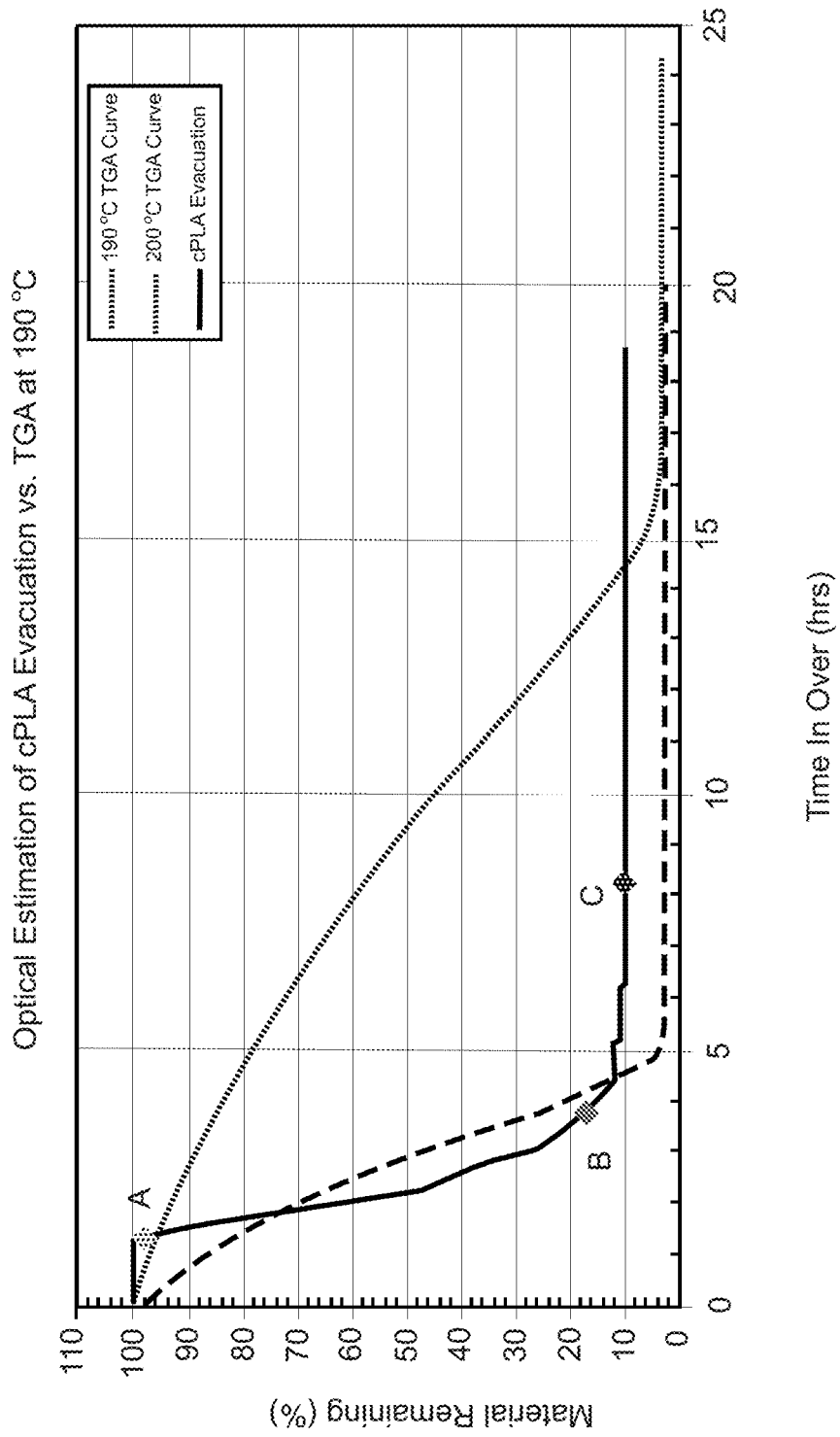
FIG. 17 illustrates the percentage of cPLA material retained in the channels at 190° C. as a function of time as measured by optical imagery within a curved microvascular composite panel (solid black) and as measured by TGA (dotted black), locations A, B, and C refer to images in FIGS. 16A-16C, respectively, according to an embodiment of the invention.

FIGS. 16-16C depicts cPLA removal at 190° C. oven set temperature, (FIG. 16), with a time sequential progression of cPLA evacuation presented along a diagonal. FIG. 16A shows the initial weeping of material around the drilled holes after approximately 1.2 hours in the oven at 190° C., and circles indicate drilled hole locations. FIG. 16B shows reverse contrast image after 3.8 hours, zoomed image shows material building up at circled location XI due to inclined slope. FIG. 16C depicts the same material after 18 hours at 190° C. under dynamic vacuum, and that residual material still remains in the channels after removal from the oven. FIG. 17 illustrates the percentage of cPLA material retained at 190° C. as a function of time as measured by optical imagery within a curved microvascular composite panel (solid black) and as measured by TGA (dotted black). Locations A, B, and C refer to FIGS. 16A, 16B, and 16C, respectively.

cPLA removal in Microvascular Curved Panel Fabrication at 200° C.

Figure 18A:
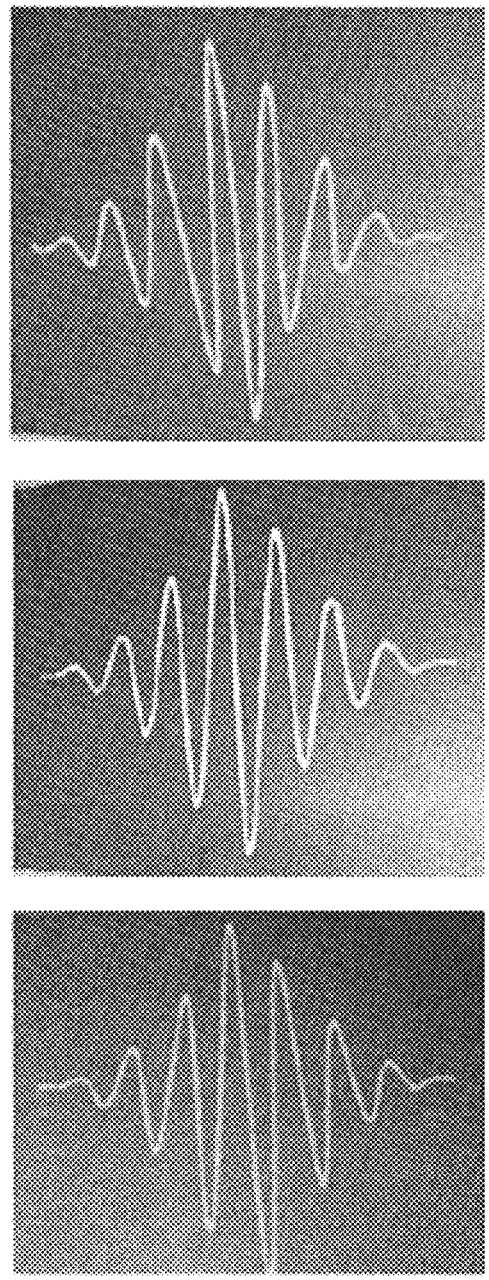
Figure 19:
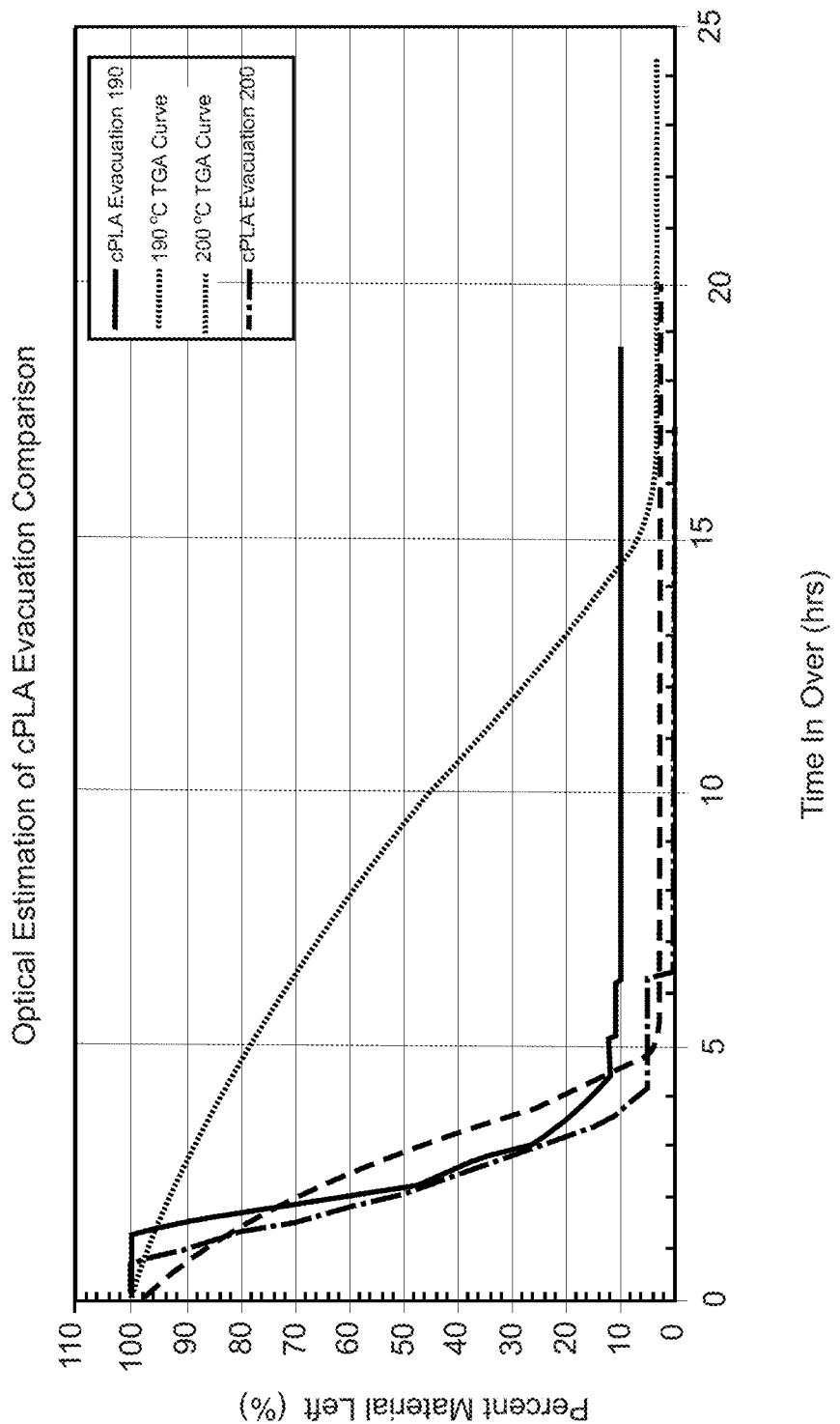
FIG. 19 depicts the percentage of cPLA material retained at 200° C. as a function of time as measured by optical imagery within a curved microvascular composite panel (solid blue) and as measured by TGA (dashed black), according to an embodiment of the invention.

In order to avoid microchannel blockages in the curved panel, the temperature of the post-cure was increased to 200° C. When the panel that was previously processed at 190° C. (with blocked passages) was reheated in the same oven at a set temperature of 200° C. for several hours, all passages became clear. As explained above, to understand the differences in sublimation processes at these temperatures, two identical sinusoidal patterns were additively printed and exposed to the post-cure conditions at 190° C. and 200° C. within a vacuum oven in the absence of the composite. Both panels were oriented flat (horizontally) so as to restrict weight lost from liquid transport. FIGS. 18A-18C depict a comparison of the retained printed patterns at 190° and 200° C. As can be seen in FIGS. 18A-18C, both the pattern at 190° C. and at 200° C. the sample retained a significant mass fraction (~10%) and the printed shape. This suggested that while a similar final residual weight might result at the two different temperatures, the process occurring at 200° C. within the microchannels is more conducive to clearing the passages. For example, in comparing FIG. 17 with FIG. 19, it can be observed that the amount of residual material in the channels saturates to approximately 10% at 190° C. and 5% at 200° C. largely from the liquid flowing out. In fact, the sharp decrease in the amount retained near the 7-minute mark is due to a final liquid slug of material being removed from the channel. When cooled and checked for the ability to flow, all channels were open and unclogged.

It is thought that the higher vapor pressure from increased temperature and sublimation could be driving the final material out of the channel. The pressure build-up may be significantly above atmosphere and a vacuum atmosphere may not be needed to achieve an equivalent pressure difference. It is noted that one of the difficulties of using a vacuum oven is the absence of a convective atmosphere to uniformly distribute the heat from the sidewalls. Using a thermocouple on the center of the curved part of the material, a 15° C. temperature difference between the oven set temperature and part temperature was observed. Direct application of pressure to the channel may assist with the expulsion of material, but the passive evacuation without the external application of pressure and within a convective oven may be preferred for simplicity. Since significant liquid flow-out was observed at 200° C., a viable and time expedient cPLA extraction method would appear to include a gravity-driven liquid extraction followed by a higher temperature sublimation to remove residual material all within a convective oven.

Figure 20:
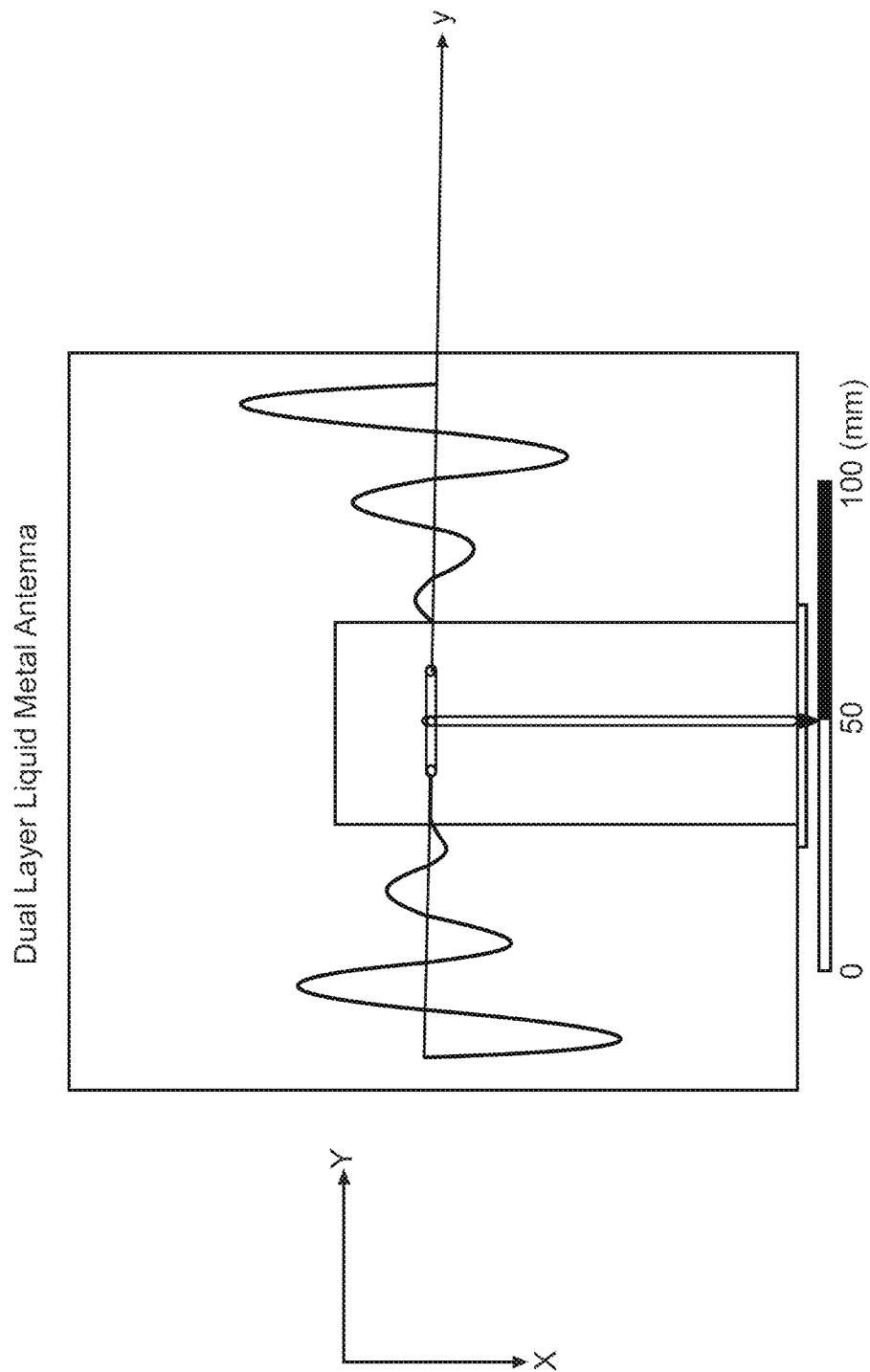
FIG. 20 illustrates a reconfigurable antenna arrangement as tested, according to an embodiment of the invention.
Figure 21:
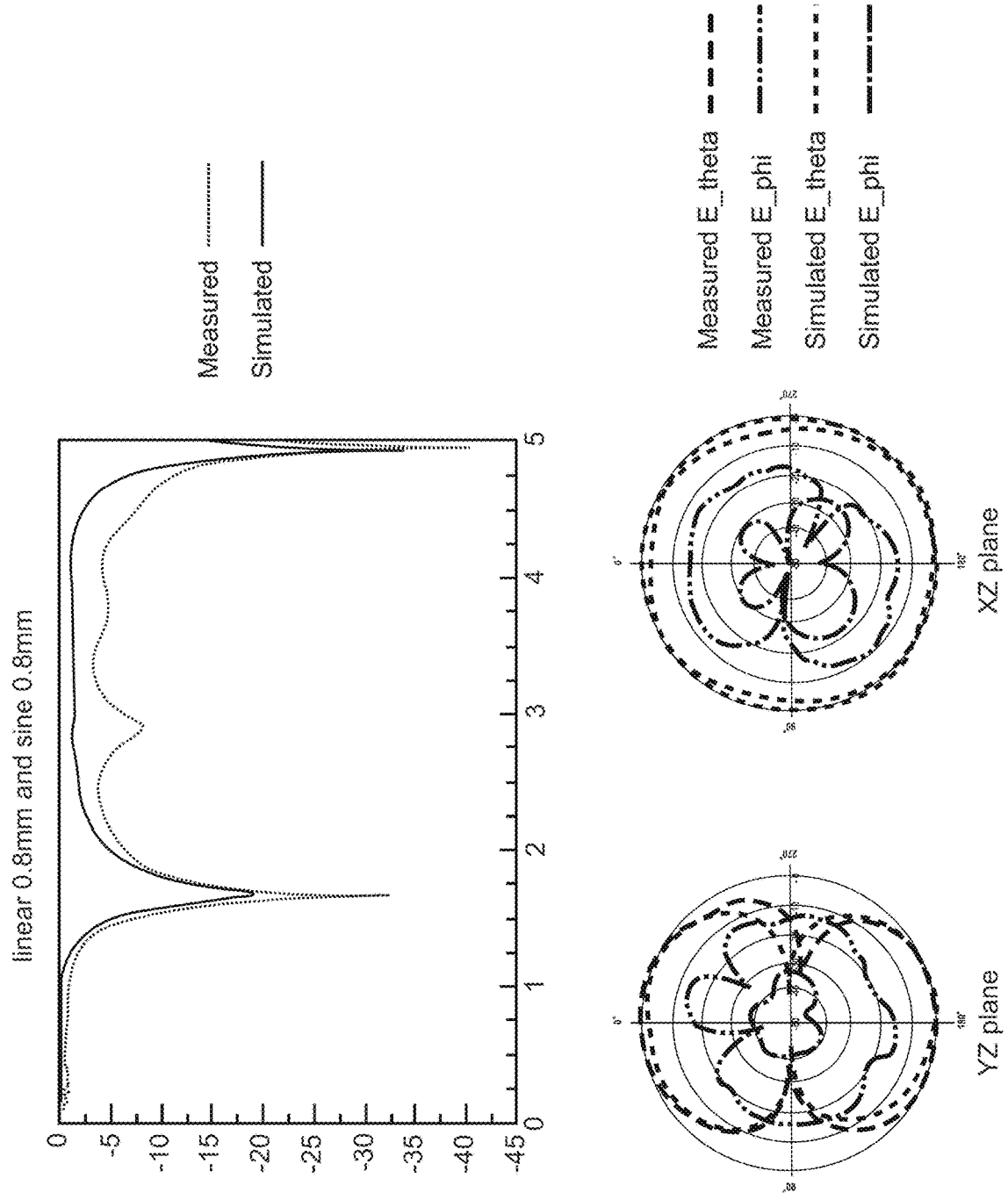
FIGS. 21-29 illustrate performance characteristics of the reconfigurable antenna of FIG. 20, according to an embodiment of the invention.
Figure 22:
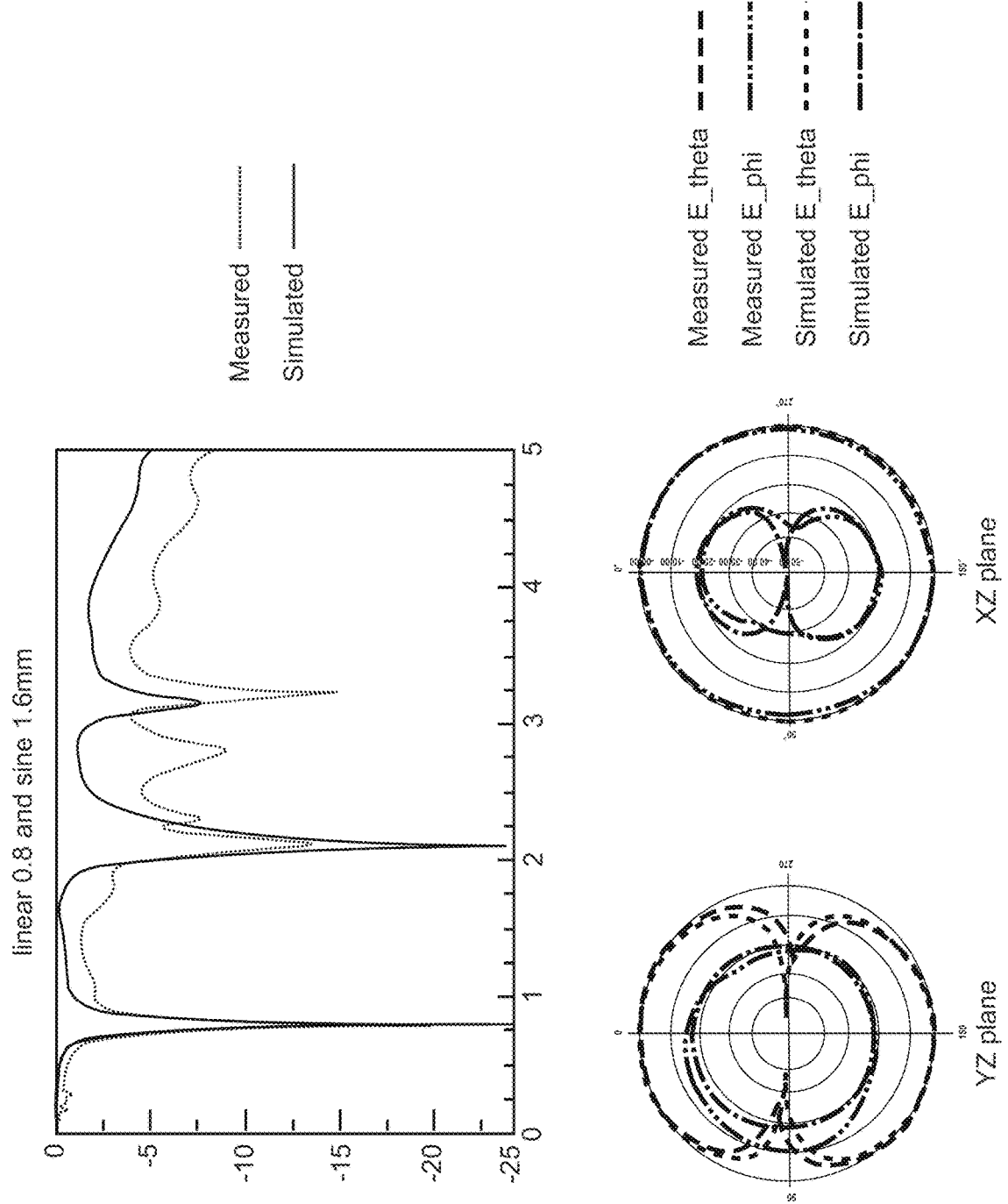
Figure 23:
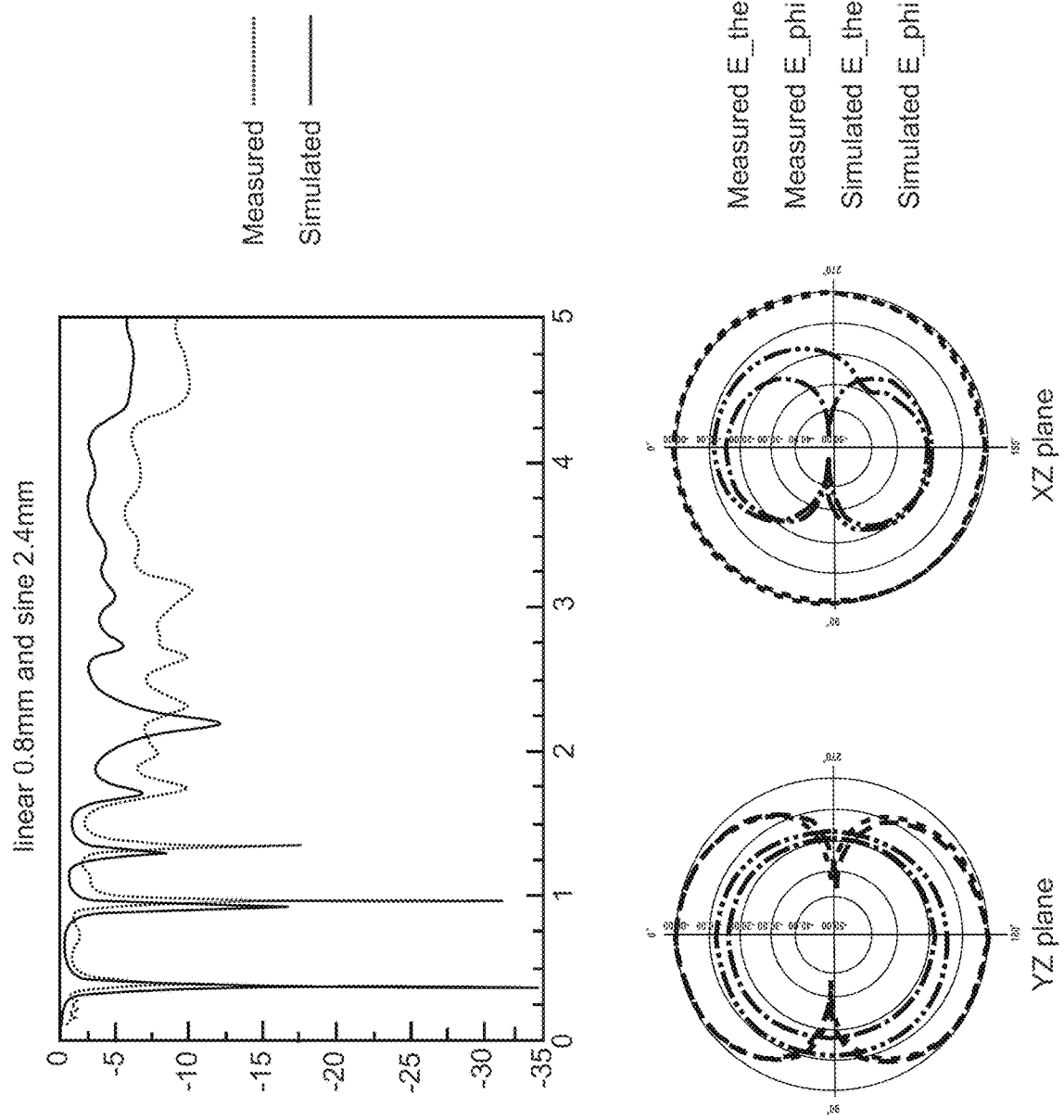
Figure 24:
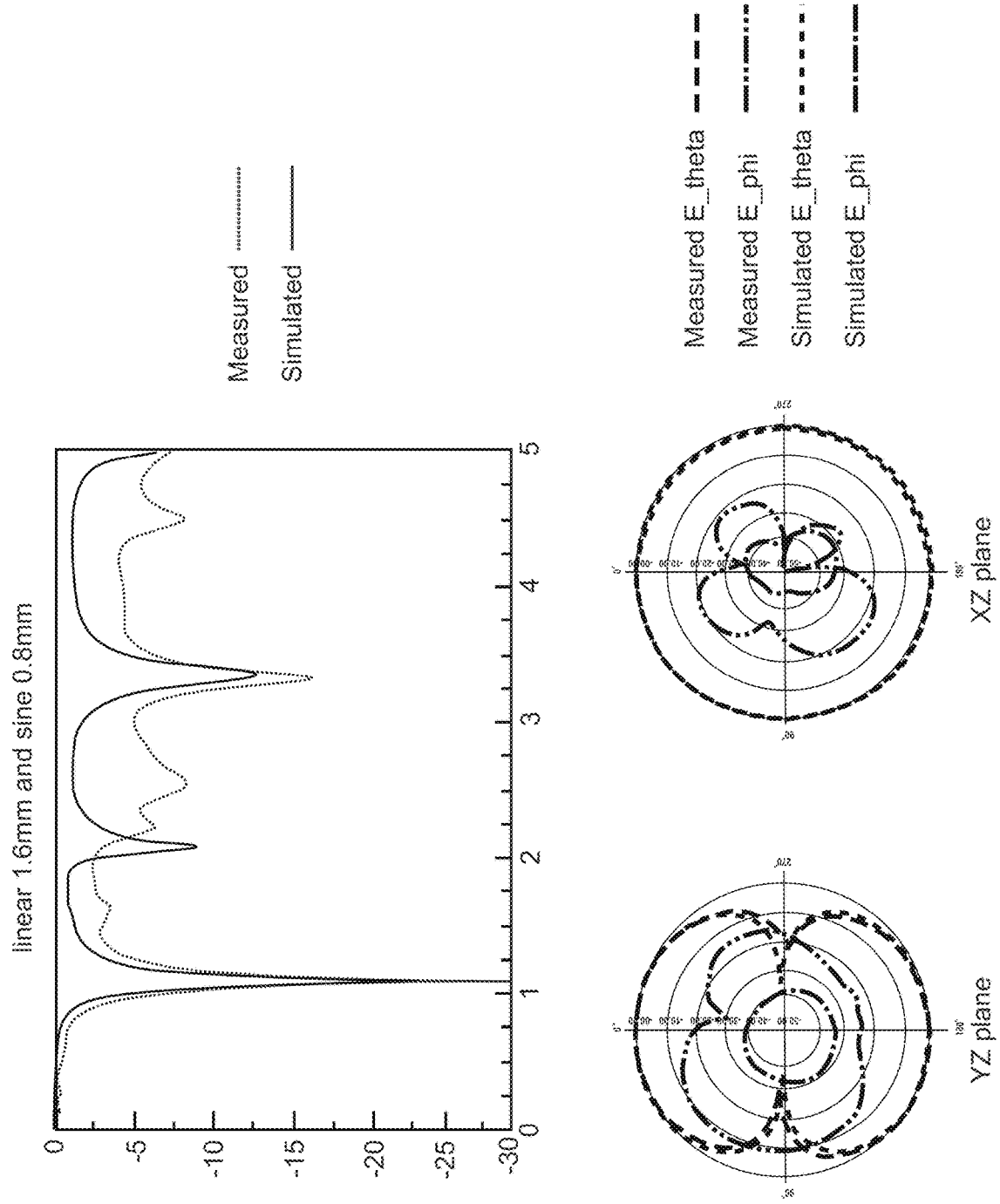
Figure 25:
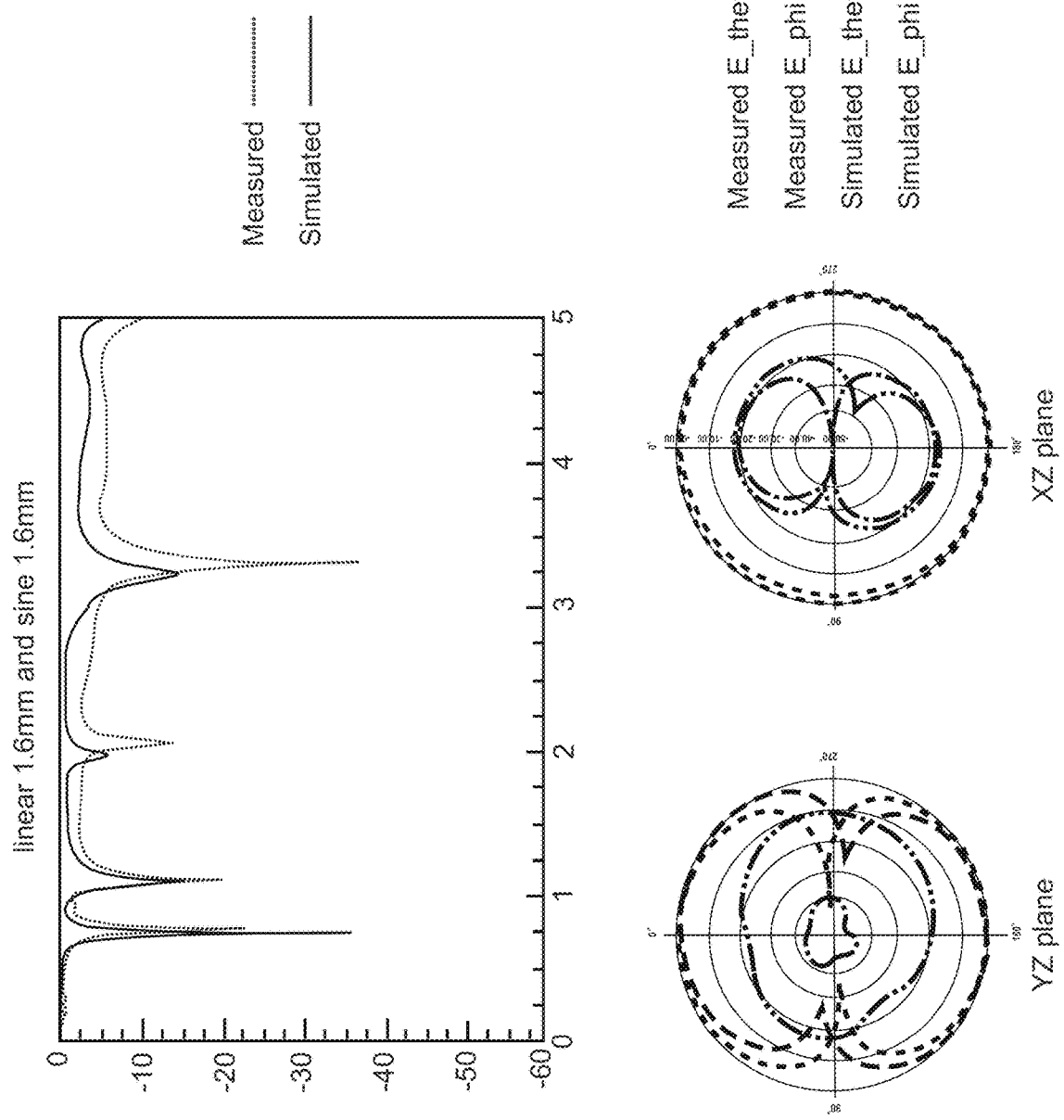
Figure 26:
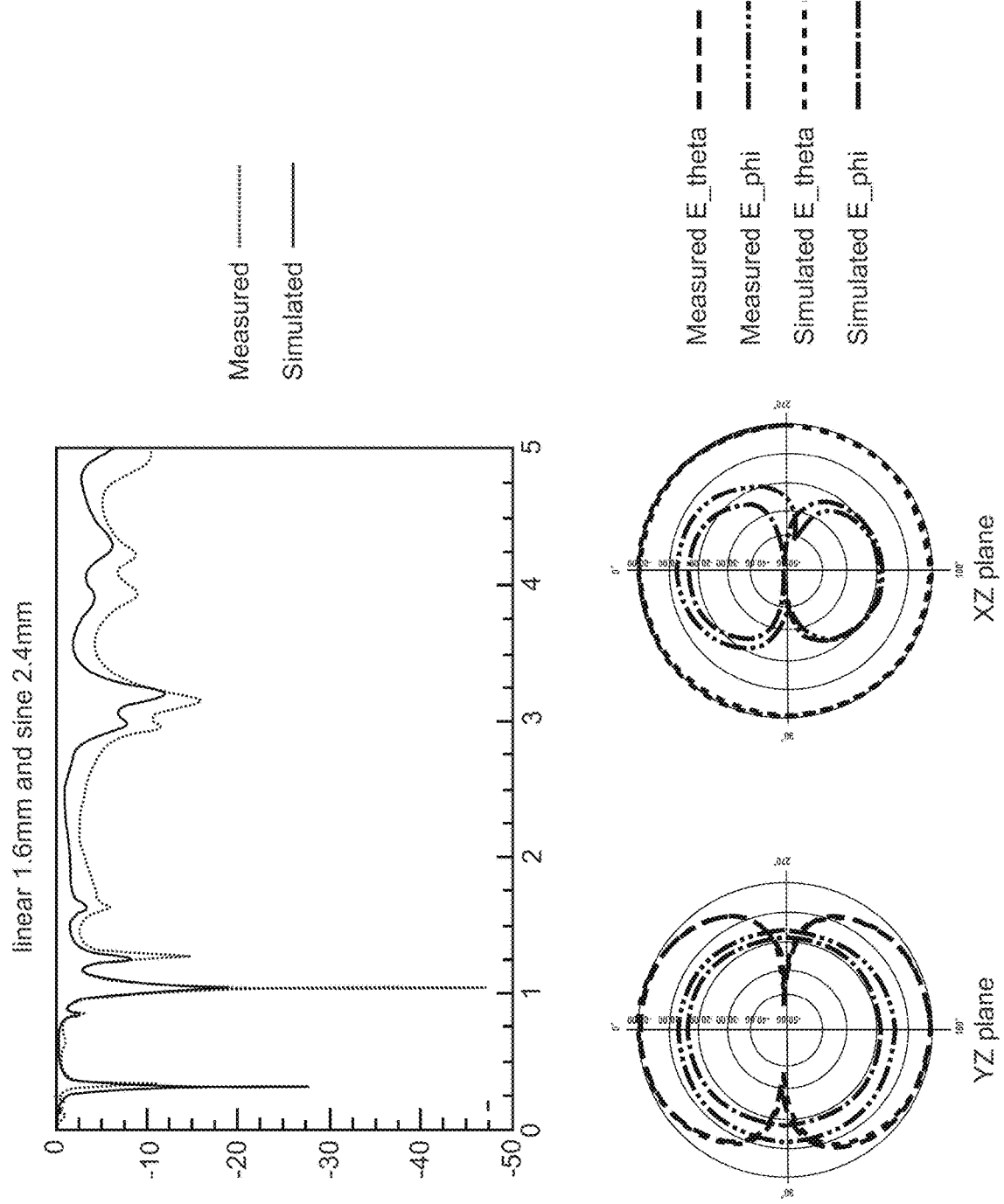
Figure 27:
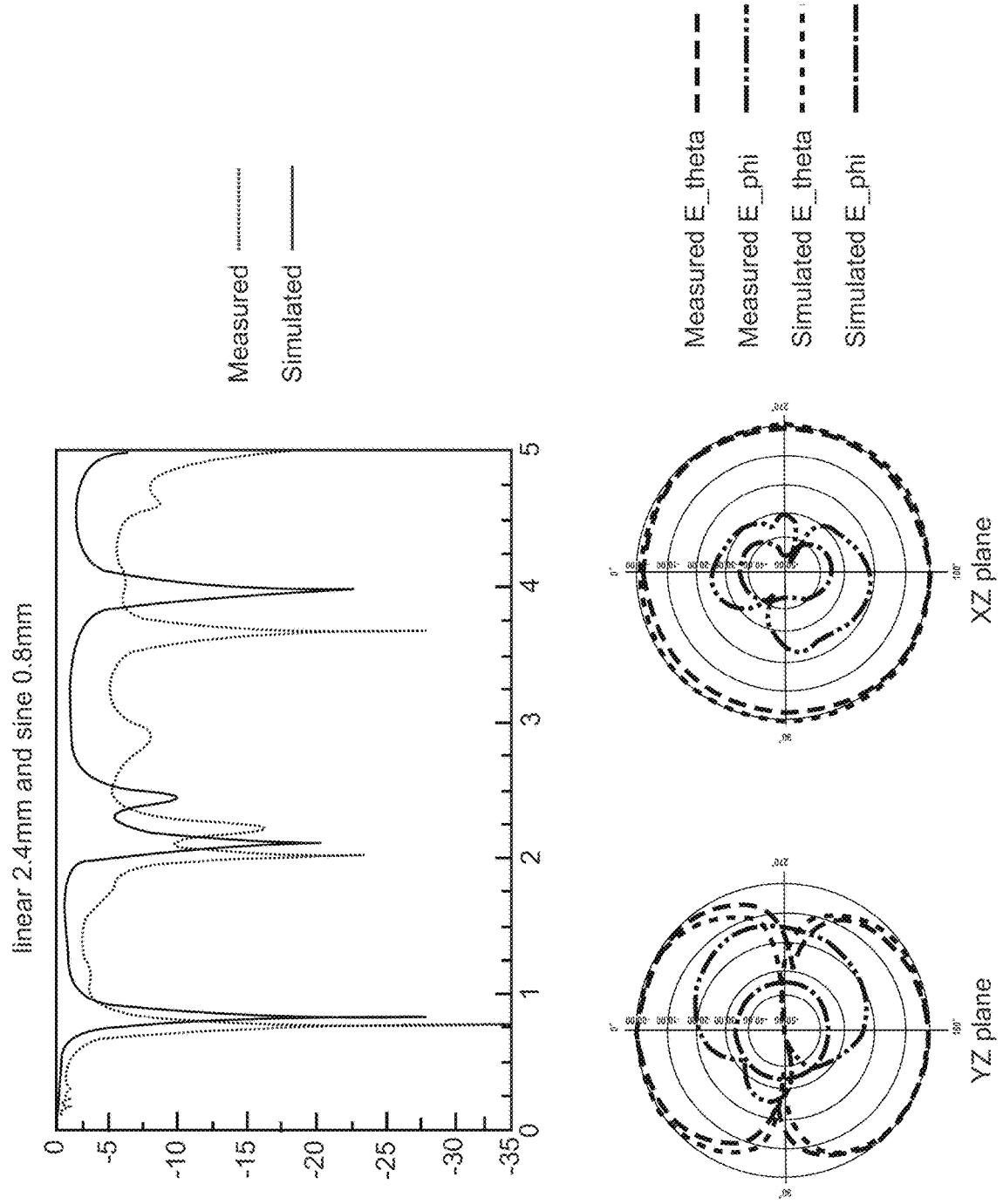
Figure 28:
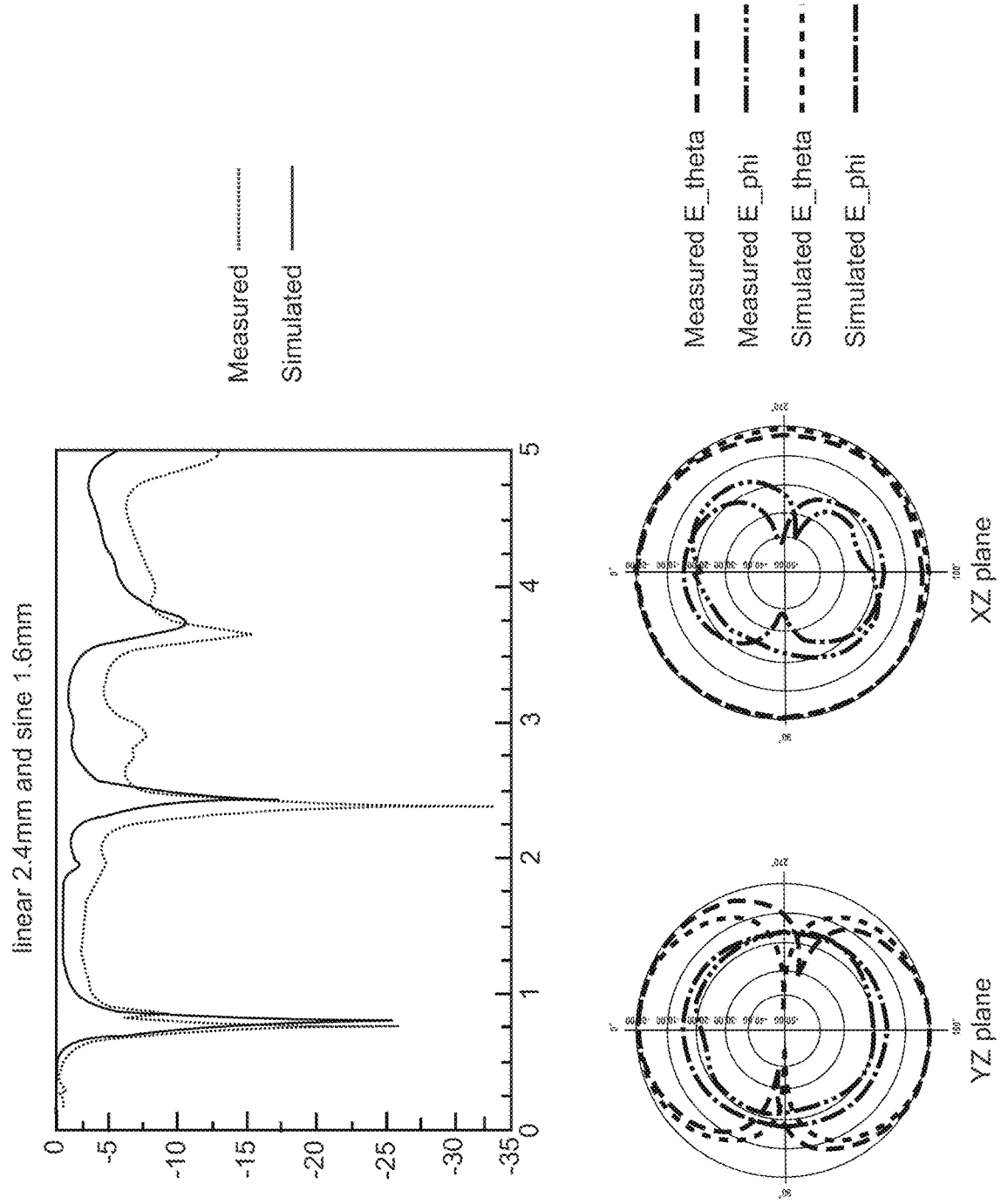
Figure 29:
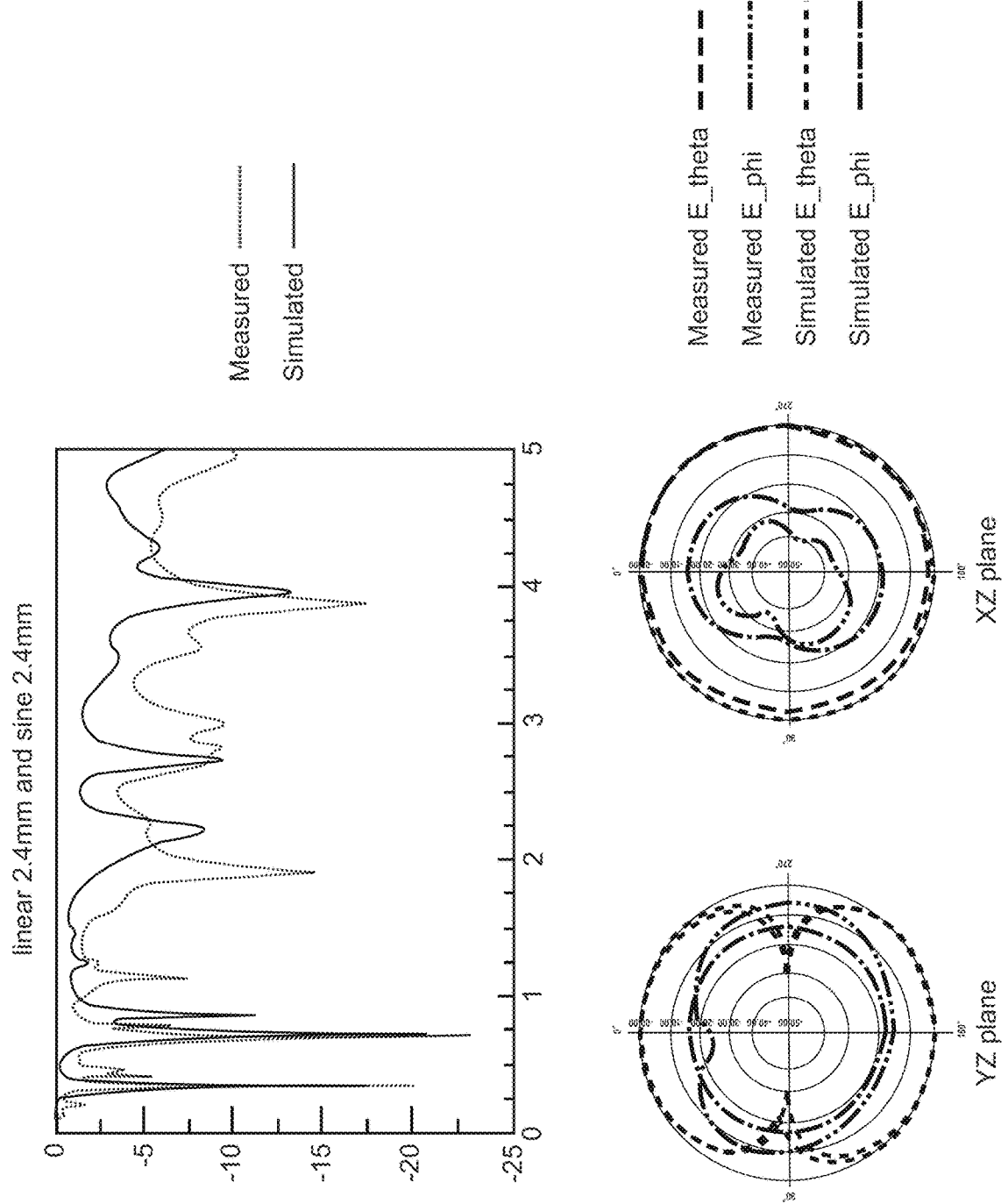

FIG. 20 illustrates a reconfigurable antenna arrangement as tested, according to an embodiment of the invention. This arrangement corresponds closely to that of FIG. 1, above.

FIGS. 21-29 illustrate performance characteristics of the reconfigurable antenna of FIG. 20, according to an embodiment of the invention.

Patterned microchannels were created within a complex curved composite structure using fused deposition printing of sacrificial catalyzed poly(lactic acid) cPLA followed by transfer, composite lamination, composite cure, and thermal removal of the sacrificial cPLA during post-cure. The post-cure removal process of the cPLA was sensitive to temperature, as explained above. At an oven set temperature of 190° C., the cPLA was largely liquid and flowed out of the composite under the influence of gravity, but with (~10%) retained residual material which blocked several passages. When the oven temperature was increased to 200° C., the cPLA incurred a similar liquid out-flow of materials, but with less (~5%) retained material until all measurable material was removed to leave all microchannels clear for transport. Microvascular channels may be back-filled with liquid metal alloys and used as a reconfigurable RF element. Overall, this processing technique enables many type of microvascular composites whose channels can be computer designed, additively-printed, integrated with traditional laminate processing, and effectively evacuated to enable a variety of multifunctional concepts including the liquid metal based structurally embedded vascular antennas (SEVA) described here.

The SEVA concept described here consists of multiple elements of single log-normal-like zig-zag configuration with a consistent shape oriented in line along the leading edge. However, the invention of arraying these planar element but is not limited by the shape of the element, the number of elements, or the arrangement of elements. The additively-printed catalyzed poly(lactic acid) (cPLA) was obtained by a commercial entity, but the invention should not be limited to this material or process since there are many ways to create microvascular passages within a structural composite, including the placing of tubes, inflated mandrels, shrink tubes, solder material, glass capillaries, electrical discharge, and others. Similarly, the relative composition and physical characteristics of the liquid metal (including the potential to metal and flow only when needed) does not change the essential aspects of this invention.

Other applications for the invention may include self-healing of cracked composites which need to maintain electrical continuity, composite panels survivable to thermal excursions, using the liquid metal transport to detect the characteristics of the impinging radiation, magneto-hydrodynamic pumps, lightning strike protection (including evaporative cooling), resilient protection against electromagnetic pulse, active RF structural optical elements/lens (wide angle impedance matching to compensate for distortion from variable thickness of the structure or focusing of an incoming beam to an internal element with limited bore sight error), reconfigurable mimicking of an electrical signature, agile EM shutters in radomes, and reconfigurable embedded electronics As disclosed above, the physical operation and computational analysis of a reconfigurable liquid metal-based bowtie antenna may be embedded into a proven aerospace structural composite, known as the SEVA-ES (structurally embedded vascular antenna-exponential sinusoid). As demonstrated above, traditional laminate composite fabrication methods may be combined with 3-D printing, and a sacrificial polymer may be used to form complex channels of planar form within a composite. A novel feed structure may be designed, built, and integrated that satisfies both liquid mass transfer and electromagnetic energy transfer requirements.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A reconfigurable antenna comprising:
a panel having one or more liquid metal pumps coupled to a power supply;
one or more liquid metal reservoirs in fluid communication with the one or more pumps;
one or more metal traces for injecting RF energy;
one or more channels for transporting the liquid metal, each of the one or more channels having a proximal end in fluid communication with the one or more pumps, each of the one or more channels having a vent at a distal end,
one or more return circuits fluidically connecting the distal end of the one or more channels to one or more inlet ports situated where the one or more channels couple with the one or more metal traces, wherein application of power to the one or more pumps moves the liquid metal into or out of the channels and the return circuits thereby reconfiguring the antenna,
wherein the one or more pumps are magnetohydrodynamic pumps, wherein the one or more pumps are reversible to control the direction of the flow of the liquid metal and to completely withdraw the liquid metal from the channels.

2. The reconfigurable antenna of claim 1, further comprising a layer of a phosphonic acid on the liquid metal-bearing channel surfaces.

3. The reconfigurable antenna of claim 2, where the phosphonic acid is selected from the group consisting of decylphosphonic acid (DPA), fluorobenzylphosphonic acid (FPA), and difluorobenzylphosphonic acid (DFPA).

4. The reconfigurable antenna of claim 1, further comprising one or more sensors for determining the position of the liquid metal in the channels.

5. The reconfigurable antenna of claim 4, wherein the one or more sensors include one or more flow meters and optical sensors.

6. The reconfigurable antenna of claim 1, wherein the panel comprises one of a conformal load-bearing panel, and an aircraft skin panel.

7. The reconfigurable antenna of claim 1, wherein the channels have internal dimensions ranging between 200-700 µm in height and 200-700 µm in width.

8. The reconfigurable antenna of claim 1, wherein the liquid metal reservoir further comprises a heat exchanger.

9. The reconfigurable antenna of claim 1, wherein the channels have a sectional shape corresponding approximately to a circle and an ellipse.

10. The reconfigurable antenna of claim 1, wherein each channel is formed in one or more layers of a panel.

* * * * *